US012436046B1

(12) United States Patent
Choe et al.

(10) Patent No.: US 12,436,046 B1
(45) Date of Patent: Oct. 7, 2025

(54) MULTIFUNCTIONAL CALORIMETER FOR MEASUREMENTS OF LUMPED AND TWO DIMENSIONAL HEAT GENERATION RATES AND ENTROPY COEFFICIENTS OF POUCH TYPE LITHIUM-ION BATTERY

(71) Applicant: AUBURN UNIVERSITY, Auburn, AL (US)

(72) Inventors: Song-Yul Choe, Auburn, AL (US); Yang Hu, Irvine, CA (US)

(73) Assignee: AUBURN UNIVERSITY, Auburn, AL (US)

( * ) Notice: Subject to any disclaimer, the term of this patent is extended or adjusted under 35 U.S.C. 154(b) by 489 days.

(21) Appl. No.: 17/959,044

(22) Filed: Oct. 3, 2022

Related U.S. Application Data

(60) Provisional application No. 63/251,253, filed on Oct. 1, 2021.

(51) Int. Cl.
*G01K 17/00* (2006.01)
*G01N 25/20* (2006.01)

(52) U.S. Cl.
CPC .............. *G01K 17/00* (2013.01); *G01N 25/20* (2013.01)

(58) Field of Classification Search
CPC ................................ G01K 17/00; G01N 25/20
USPC ................................................ 374/31, 33, 29
See application file for complete search history.

(56) References Cited

U.S. PATENT DOCUMENTS

| 8,691,456 | B2 | 4/2014 | Choe et al. |
| 9,197,089 | B2 | 11/2015 | Choe et al. |
| 11,283,103 | B2 | 3/2022 | Hong et al. |
| 2021/0013731 | A1 | 1/2021 | Choe et al. |

(Continued)

FOREIGN PATENT DOCUMENTS

| CN | 114729908 A | * | 7/2022 | ............ G01K 17/04 |
| WO | 2009/009148 A1 | | 1/2009 | |
| WO | WO-2021010335 A1 | * | 1/2021 | |

OTHER PUBLICATIONS

Al Hallaj, S., Prakash, J., Selman, J. R., "Characterization of commercial Li-ion batteries using electrochemical- calorimetric measurements," Journal of Power Sources, vol. 87, No. 1, pp. 186-194, Apr. 2000, doi: 10.1016/S0378-7753(99)00472-3.

(Continued)

*Primary Examiner* — Mirellys Jagan
(74) *Attorney, Agent, or Firm* — Holland & Knight LLP; Matthew C. Cox

(57) ABSTRACT

A system and method are disclosed of using a calorimeter apparatus for measuring lumped and two dimensional heat generation of a battery cell having a battery cell surface. The apparatus can include a first thermoelectric assembly, a second thermoelectric assembly, and at least two heat flux sensors positioned between the first and second thermoelectric assemblies. The first and second thermoelectric assemblies can be operable to selectively receive the battery cell between the first and second thermoelectric assemblies and substantially maintain the temperature of the battery cell surface in conformity with a predetermined temperature profile. When the battery cell is positioned between the first and second thermoelectric assemblies, the at least two heat flux sensors are operable to measure heat generation rates of the battery cell at corresponding portions of the battery cell surface.

20 Claims, 16 Drawing Sheets

(56) References Cited

U.S. PATENT DOCUMENTS

2023/0275288 A1* 8/2023 Choe .................. H01M 10/617
                                                                                                            429/62

OTHER PUBLICATIONS

Bang, H., Yang, H., Sun, Y. K., Prakash, J., "In Situ Studies of $Li_xMn_2O_4$ and $LixAl0.17Mn1.83O3.97S0.03$ Cathode by IMC," Journal of The Electrochemical Society, vol. 152, No. 2, pp. A421-A428, Jan. 2005, doi: 10.1149/1.1851035.

Hu, Y., Choe, S. Y., Garrick, T. R., "Hybridized time-frequency method for the measurement of entropy coefficient of lithium-ion battery," Electrochima Acta, p. 137124, Sep. 2020, doi: 10.1016/j.electacta.2020.137124.

Lin, C., Xu, S., Liu, J., "Measurement of heat generation in a 40 Ah $LiFePO_4$ prismatic battery using accelerating rate calorimetry," Int. J. Hydrogen Energy, vol. 43, No. 17, pp. 8375-8384, Apr. 2018, doi: 10.1016/j.ijhydene.2018.03.057.

Onda, K., Kameyama, H., Hanamoto, T., Ito, K., "Experimental Study on Heat Generation Behavior of Small Lithium-Ion Secondary Batteries," Journal of The Electrochemical Society, vol. 150, No. 3, p. A285, Jan. 2023, doi: 10.1149/1.1543947.

Xiao, M., Choe, S. Y., "Theoretical and experimental analysis of heat generations of a pouch type $LiMn_2O_4$/carbon high power Li-polymer battery," Journal of Power Sources, vol. 241, pp. 46-55, Apr. 2013, doi: 10.1016/j.ipowsour.2013.04.062.

Yin, Y., Zheng, Z., Choe, S. Y., "Design of a Calorimeter for Measurement of Heat Generation Rate of Lithium Ion Battery Using Thermoelectric Device," SAE Int. J. Altern. Powertrains, vol. 6, No. 2, Mar. 28, 2017, doi: 10.4271/2017-01-1213.

* cited by examiner

MULTIFUNCTIONAL CALORIMETER FOR MEASUREMENTS OF LUMPED AND TWO DIMENSIONAL HEAT GENERATION RATES AND ENTROPY COEFFICIENTS OF POUCH TYPE LITHIUM-ION BATTERY

CROSS-REFERENCES TO RELATED APPLICATIONS

This application is a non-provisional of U.S. Patent Application No. 63/251,253 filed Oct. 1, 2021 entitled Multifunctional calorimeter For Measurements of Lumped and Two Dimensional Heat Generation Rates and entropy Coefficients of Pouch Type Lithium-Ion Battery, which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present disclosure relates generally to calorimeters for testing battery cell performance parameters.

With the advantages of high energy and power density and long cycling life, lithium-ion batteries are promising alternative energy storage sources employed for a wide range of portable electronic devices, pure hybrid and electric vehicles (EV, HEV and PEV) and stationary applications. Charging and discharging of the lithium-ion batteries generates heat that should be properly rejected to secure reliable and safe operations by battery thermal management systems (BTMS). In order to design BTMS cost-effectively and efficiently, the thermal behaviors of the cells including the lumped heat generation rate (L-HGR), 2D heat generation rate distribution (2D-HGR), and the associate heat source terms should be accurately characterized as a function of C-rates, SOC, temperatures, and progression in degradation.

Currently, the heat generation rate of the battery can be measured by two types of commercial calorimeters: accelerated rate calorimetry (ARC) and isothermal heat conduction calorimetry (IHC). The ARC measures the heat generation rate under an adiabatic environment, where the amount of heat released to the ambient is estimated by measuring the cell's temperature changes, while the IHC does the heat generation rate at a constant temperature. Both methods provide a sufficiently accurate and dynamic measurement of the heat generation rate of cells, but are currently limited to small-sized coin or cylindrical cells.

However, high power energy or battery cells utilized for larger systems such as electronic vehicles often have a larger footprint or surface area, for instance with preferred pouch type battery cells, that can make measuring heat generation rates with conventional ARC and IHR methods can more difficult and inaccurate. Larger battery cell types can benefit from a recently developed design concept for a calorimeter for measurement of HGR. The calorimeter uses two thermoelectric modules (TEMs) as a heat pump, accompanied with a closed loop controller to regulate the surface temperature of the cell to a set reference. When the heat is generated in the cell, the heat acts like a disturbance to the closed loop, so the output of the controller is the same as the disturbance at a steady state, which sign is opposite to the heat. Then, the heat generation rate is directly estimated by a Kalman filter using a simplified heat transfer model of the TEM. However, the accuracy of such measurements using the calorimeter is heavily affected by the variation of the ambient temperature and the variant temperatures across the battery cell, which requires complicated and expensive calibration processes to compensate for such effects.

The prior art calorimeters discussed above can provide an accurate method for measurement of the L-HGR of cells. However, since electric vehicles in particular need a prolonged drive range and at the same time a short charging time, high energy cells are preferred, which leads to an increased size of the pouch cells. On the other hand, reduction of charging time is accomplished by increased charging currents that results in high heat generation that requires advanced cooling methods. But it is impossible to uniformly reject the heat because of the large cross-section and the large amount of the heat produced during operation of the battery cell. As a result, a non-uniformity of the temperature is usually formed on the surface of the cell. The lack of temperature uniformity can affect the battery performance and lifetime, and potentially leading to degradation and thermal runaway, and thus, requires a more complex cooling system in the BTMS.

Therefore, there exists a strong desire to accurately measure two-dimensional distribution of heat generation in larger high energy battery cells.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the present disclosure is a calorimeter apparatus for measuring lumped and two dimensional heat generation of a battery cell having a battery cell surface. The apparatus can include a first thermoelectric assembly, a second thermoelectric assembly, and at least two heat flux sensors positioned between the first and second thermoelectric assemblies. The first and second thermoelectric assemblies can be operable to selectively receive the battery cell between the first and second thermoelectric assemblies and substantially maintain the temperature of the battery cell surface in conformity with a predetermined temperature profile. When the battery cell is positioned between the first and second thermoelectric assemblies, the at least two heat flux sensors are operable to measure heat generation rates of the battery cell at corresponding portions of the battery cell surface.

Another aspect of the present disclosure is a method for measuring the two dimensional heat generation rate of a battery cell having a battery cell surface, the method comprising the step of providing a calorimeter apparatus including: a first thermoelectric assembly; a second thermoelectric assembly; and at least two heat flux sensors positioned between the first and second thermoelectric assemblies. The method can further include placing the battery cell between the first and second thermoelectric assemblies with the heat flux sensors in a position to measure the heat generation rates of corresponding portions of the battery cell surface; maintaining a temperature of the battery cell surface in conformity with a predetermined temperature profile utilizing the first and second thermoelectric assemblies; performing a charging cycle and/or a discharging cycle in the battery cell; and measuring the heat generation rates of corresponding portions of the battery cell surface during the charging cycle and/or discharging cycle. In some embodiments, the calorimeter can also be utilized to measure the lumped heat generation rate of the battery cell as well as the entropy coefficient of the battery cell.

Numerous other objects, advantages and features of the present disclosure will be readily apparent to those of skill in the art upon a review of the following drawings and description of a preferred embodiment.

DETAILED DESCRIPTION

Figure 1:
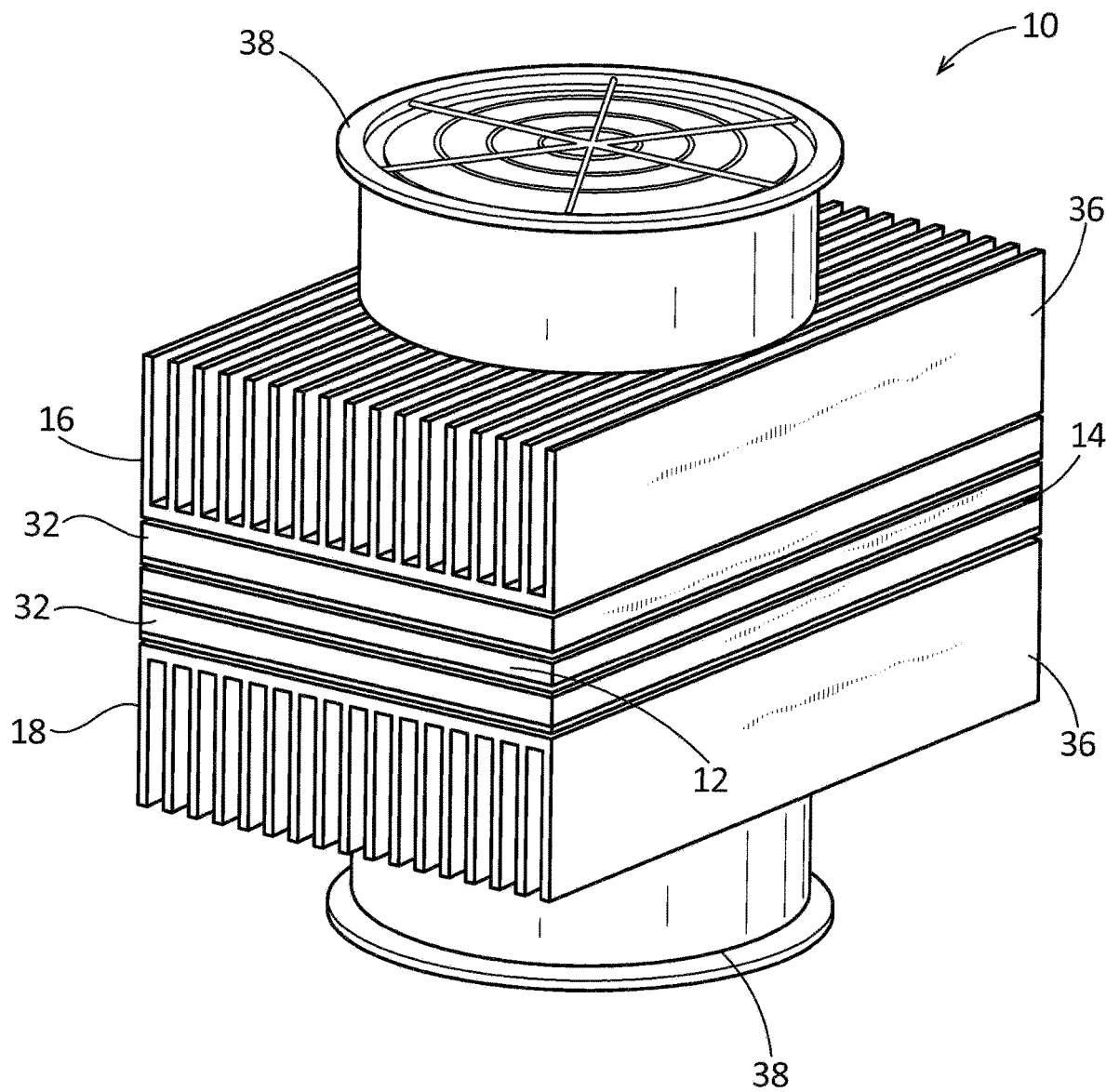
FIG. 1 is a perspective view of an embodiment of a calorimeter apparatus of the present disclosure with a battery cell positioned within the calorimeter apparatus.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

One aspect of the present disclosure, as shown in FIGS. 1-8 and 10-11, is a calorimeter apparatus 10 for measuring lumped and two dimensional heat generation of a battery cell 12 having a battery cell surface 14. The apparatus 10 can include a first thermoelectric assembly 16, a second thermoelectric assembly 18, and at least two heat flux sensors 20 positioned between the first and second thermoelectric assemblies 16 and 18. The first and second thermoelectric assemblies 16 and 18 can be operable to selectively receive the battery cell 12 between the first and second thermoelectric assemblies 16 and 18 and substantially maintain the temperature of the battery cell surface 14 in conformity with a predetermined temperature profile. When the battery cell 12 is positioned between the first and second thermoelectric assemblies 16 and 18, the at least two heat flux sensors 20 are operable to measure heat generation rates of the battery cell 12 at corresponding portions 26 of the battery cell surface 14.

In some embodiments, the calorimeter apparatus 10 can further include at least one temperature sensor 22 operable to measure the temperature of the battery cell surface 14. The apparatus 10 can also include a controller 24 communicated with the first and second thermoelectric assemblies 16 and 18 and the at least one temperature sensor 22, the controller 24 operable to control the first and second thermal assemblies 16 and 18 in response to temperature measurements received from the at least one temperature sensor 22, in order to substantially maintain the temperature of the battery cell surface 24 in conformity with the predetermined temperature profile. In some embodiments, each of the at least two heat flux sensors 20 can further include a temperature sensor 22 operable to measure the temperature of the corresponding portion of the battery cell surface 14, and the controller 24 can be operable to calculate an average temperature for the battery cell surface 14 from the temperature readings received from all of the temperature sensors 22 and substantially maintain the average temperature of the battery cell surface 14 in conformity with the predetermined temperature profile.

In some embodiments, the predetermined temperature profile can include maintaining the temperature of the battery cell 12 as measured at a single temperature sensor 22, or an average temperature as measured at multiple temperature sensors 22, at a single predetermined temperature value, for instance at 25° C. In other embodiments, the predetermined temperature profile can include maintaining different portions 26 of the battery cell surface 14 at different operating temperatures to more closely mimic typical temperature variations of the battery cell surface 14 during operation.

As shown in FIGS. 1-4, the calorimeter apparatus 10 can include two Direct-to-Air thermoelectric assemblies 16 and 18, along with heat flux sensors 20, graphite sheets 28 and composite thermal pads 30. The thermoelectric assemblies 16 and 18 can be a relatively compact device with chilled planar surfaces, which allows for a direct thermal coupling or indirect thermal coupling (for instance via graphite sheets) to objects to be cooled down. In some embodiments, the thermoelectric assemblies 16 and 18 can include metal plates 32 directed toward the battery cell 12, the metal plates 32 operating as a "cold side" of the thermoelectric assemblies from where heat is pumped by Peltier thermoelectric modules 34 and transferred to the surrounding environment by heat sinks 36 equipped with DC fans 38 at the "hot side" of the thermoelectric assemblies 16 and 18.

In some embodiments where a predetermined temperature profile includes maintaining different portions of the battery cell surface 14 at varying temperatures, the thermoelectric assemblies 16 and 18 can include independently controlled thermoelectric modules for each corresponding portion of the battery cell surface 14 to be controlled, and the controller 24 can control operation of the individual thermoelectric modules based on temperature readings from corresponding portions of the battery cell surface to individually maintain different portions of the battery cell surface 14 at various desired temperatures.

Figure 3:
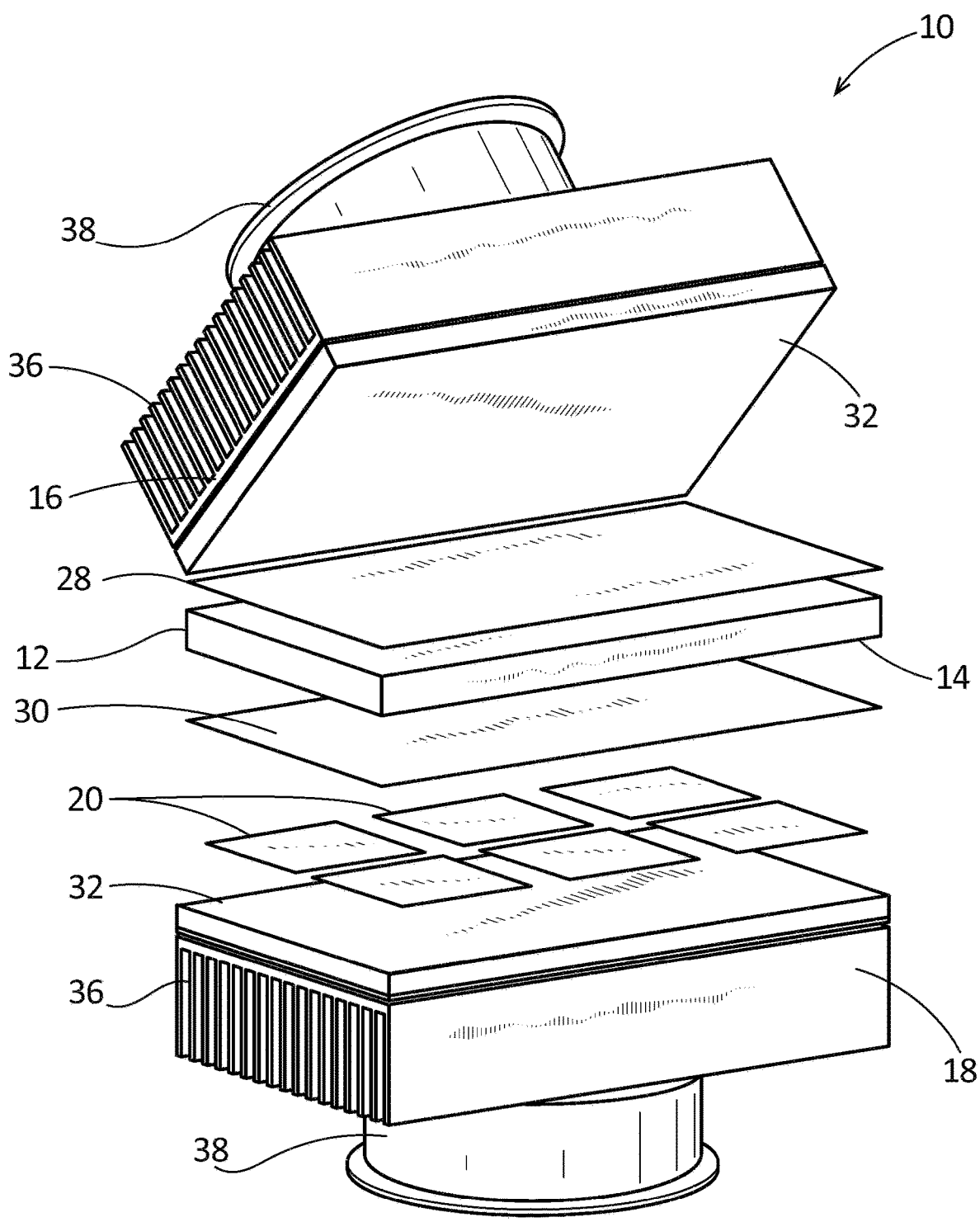
FIG. 3 is a perspective exploded view of another embodiment of a calorimeter apparatus of the present disclosure showing the use of 9 heat flux sensors.
Figure 4:
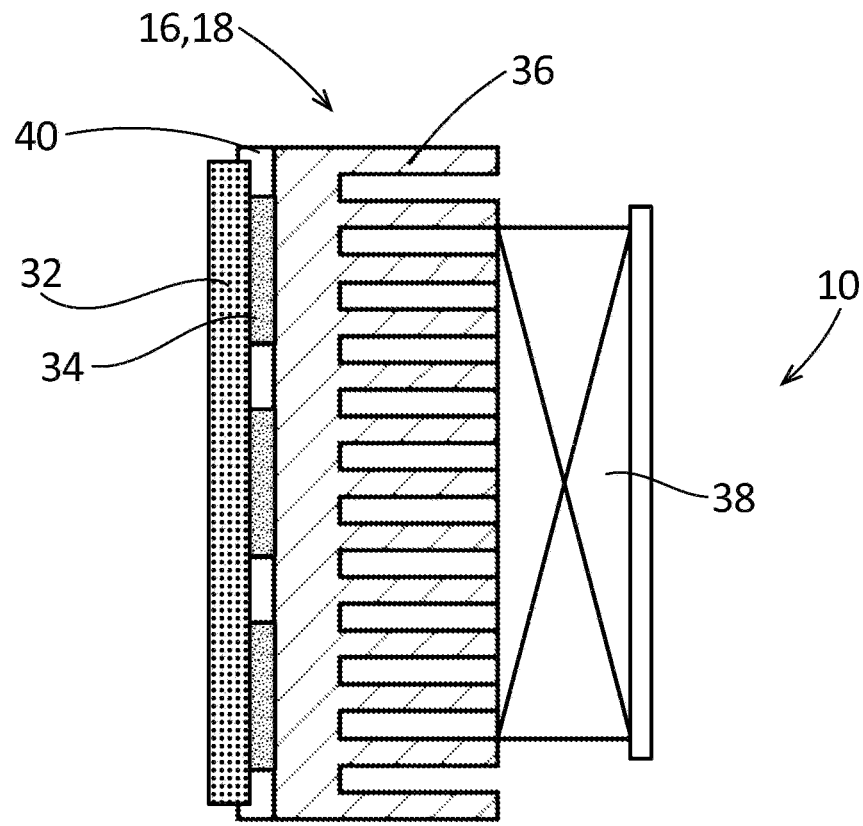
FIG. 4 is a cross-sectional view of an embodiment of a thermoelectric assembly of the present disclosure for maintaining a temperature of a battery cell in accordance with a predetermined temperature profile.

FIG. 3 shows a side view of a thermoelectric assembly 16 or 18, where thermoelectric modules 34 are embedded. The thermoelectric module 34 in some embodiments can be constructed using semiconductors that work as a small heat pump, moving heat from one side (metal plate 32 side) of the device to the other (heat sink 36 side). The direction of heat flow can be reversed when the applied current is reversed. As a result, the thermoelectric module 34 can work as either a heater and cooler, and the performance of the thermoelectric modules 34 and thus the thermoelectric assemblies 16 and 18 can be utilized as an actuator or indicator to accurately regulate or track a reference temperature. The metal plate 32 acts like a heat bridge and serves to efficiently conduct the heat between the thermoelectric module 34 and the measuring object or battery cell 14. The heat sink 36 with the fan 38 serves to transfer the heat generated by the battery cell 12 to the environment. All free spaces between the metal plate 32, thermoelectric module 34 and the heat sink 36 can be filled up with foam insulation material 40 to ensure a single heat conduction pathway that can maximize the cooling or heating efficiency of the thermoelectric assemblies 16 and 18.

In some embodiments, on the surface of the metal plates 32 of the thermoelectric assemblies 16 and 18, an extra graphite thermal sheet 28 can be placed between the metal plate 32 and the battery cell 12 to be measured to help improve the thermal conductivity between the battery cell 12 and the upper thermoelectric assembly 16 and 18 due to the softness of the graphite sheet, which can better conform to the shape of the battery cell 12.

Figure 2:
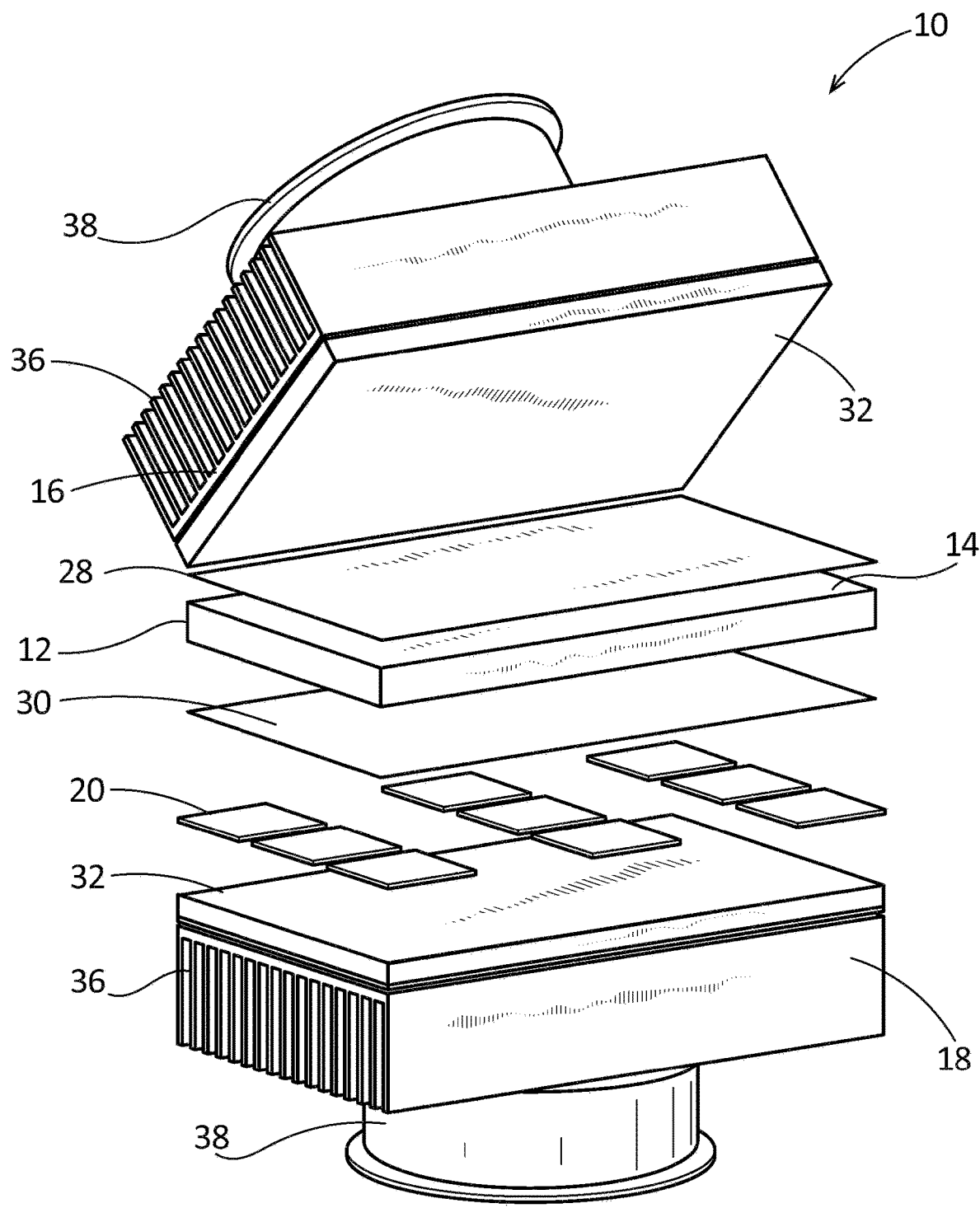
FIG. 2 is a perspective exploded view of another embodiment of a calorimeter apparatus of the present disclosure showing the use of 9 heat flux sensors.
Figure 10:
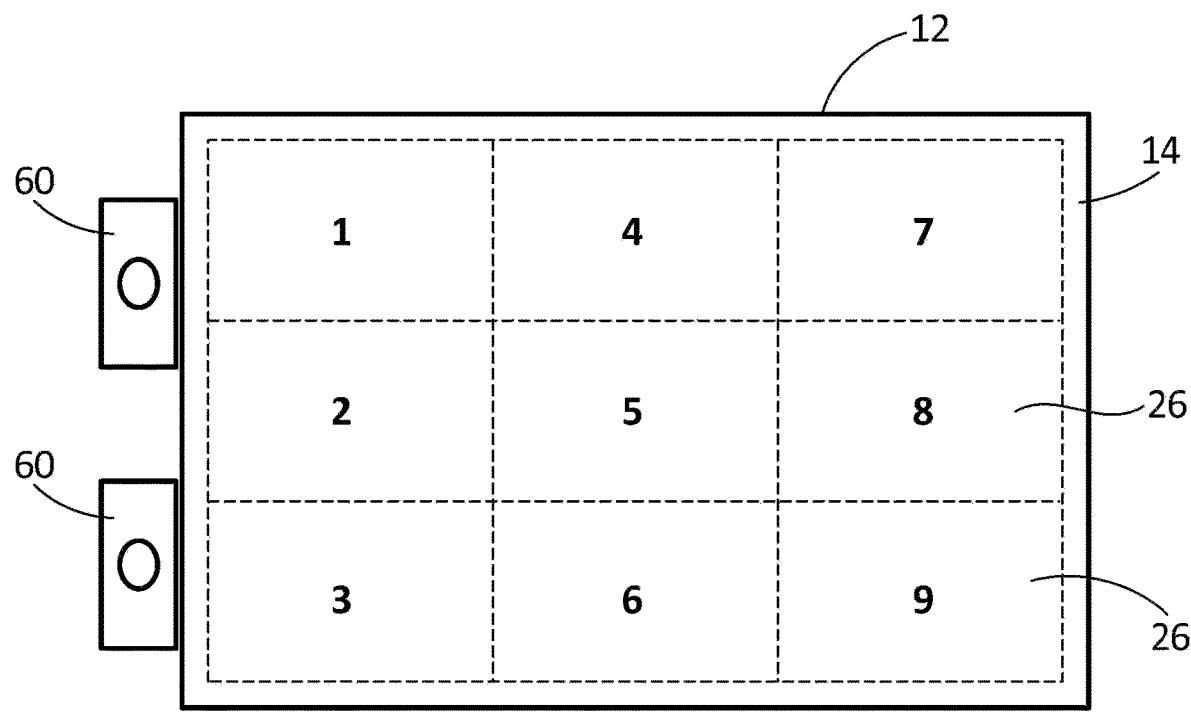
FIG. 10 is a top view of a battery cell having nine identified portions of the surface of the battery cell where heat flux and temperature measurements can be taken.

In some embodiments, as shown in FIG. 2, on the surface of the metal plate 32 of the lower thermoelectric assembly 18, nine heat flux sensors 20 can be placed to enable measurement of heat flux and temperature in nine corresponding portions of the battery cell surface 14 (as shown in FIG. 10). In other embodiments, the heat flux sensors 20 can be placed between the upper thermoelectric assembly 16 and the battery cell 12.

The number of the heat flux sensors 20 and the arrangement can be flexibly adjusted based on the dimension of a battery cell 12 to be measured and considering objectives of the measurement. The heat flux sensors 20 can be made of differential temperature thermopiles, which enables the measurement of the heat flowing through the surface of the heat flux sensor 20. The measurable heat flux range of the heat flux sensor in some embodiments can be ±150 kW/m$^2$ with a temperature range from −50° C. to 120° C., and the response time of around 0.9 seconds. In some embodiments, each heat flux sensor 20 can include a temperature sensor 22 such as a T-type thermocouple that measures the temperature within the range of −270° C.-370° C. The output of the heat flux sensor 20 is a DC voltage that is linearly proportional to the heat flux through the sensor 20. Similarly, the thermocouple 22 outputs a DC voltage signal that can be read by any compatible temperature module of a data acquisition (DAQ) system.

Figure 5:
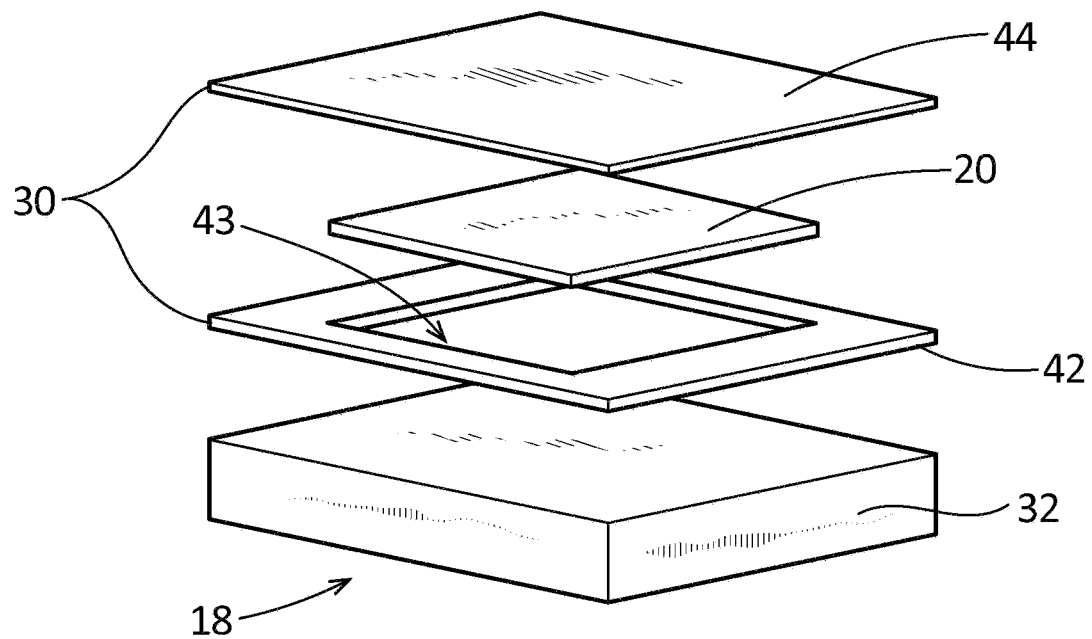
FIG. 5 is a partial exploded view showing an embodiment of a heat flux sensor embedded within a foam insulating layer of a calorimeter apparatus of the present disclosure.
Figure 6:
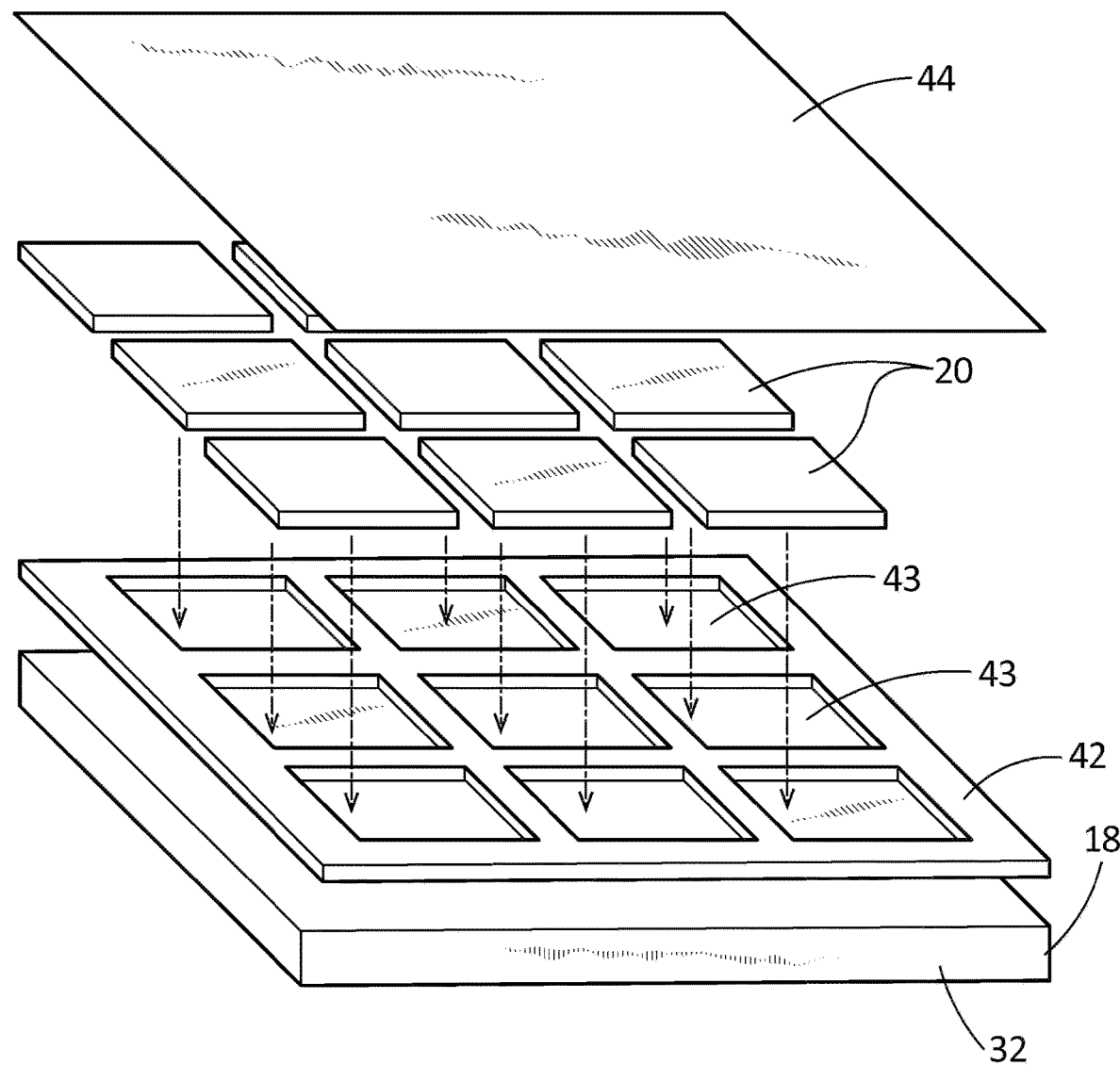
FIG. 6 is an exploded view showing a calorimeter apparatus having 9 heat flux sensors positioned within an insulating foam layer.

In some embodiments, the thickness of the heat flux sensor 20 when placed between the cell and the thermoelectric assembly's 16 or 18 metal plate 32 can form a gap between each sensor 20 and between the metal plate 32 and the battery cell 12, which may lead to a decreased heat conduction efficiency. Therefore, in some embodiments, an extra composite thermal pad 30 can be designed to improve the thermal conductivity. FIGS. 2 and 5-6 show one embodiment of a layout of this thermal pad 30 and the heat flux sensors 20 on the lower thermoelectric assembly 18.

The thermal pad 30 can include an insulating layer 42 positioned between the first and second thermoelectric assemblies 16 and 18 and around lateral sides of each of the at least two heat flux sensors 20. In some embodiments, the insulating layer 42 includes an insulating foam layer with a plurality of holes 43 cut through the insulating foam layer, each the plurality of holes shaped to conform to and receive a corresponding heat flux sensor therein. In some embodiments, the insulating foam layer 42 and the at least two heat flux sensors 20 can have substantially similar thicknesses such that each of the heat flux sensors 20 is in a substantially flush orientation with the insulating foam layer 42 to create a substantially continuous contact surface between the combination insulting layer 42 and heat flux sensor 20 and battery cell 12 to be measured. In some embodiments, the thermal pad 30 can further include a graphite thermal layer 44 positioned against the insulating foam layer 42 and the at least two heat flux cells 20, the graphite thermal layer 44 positioned between the heat flux sensors 20 and the battery cell 12 when the battery cell is received between the first and second thermoelectric assemblies 16 and 18. As noted previously, the softness of the graphite material in the graphite thermal layer 44 can help improve conductivity between the battery cell 12 and the heat flux sensors 20.

Figure 7:
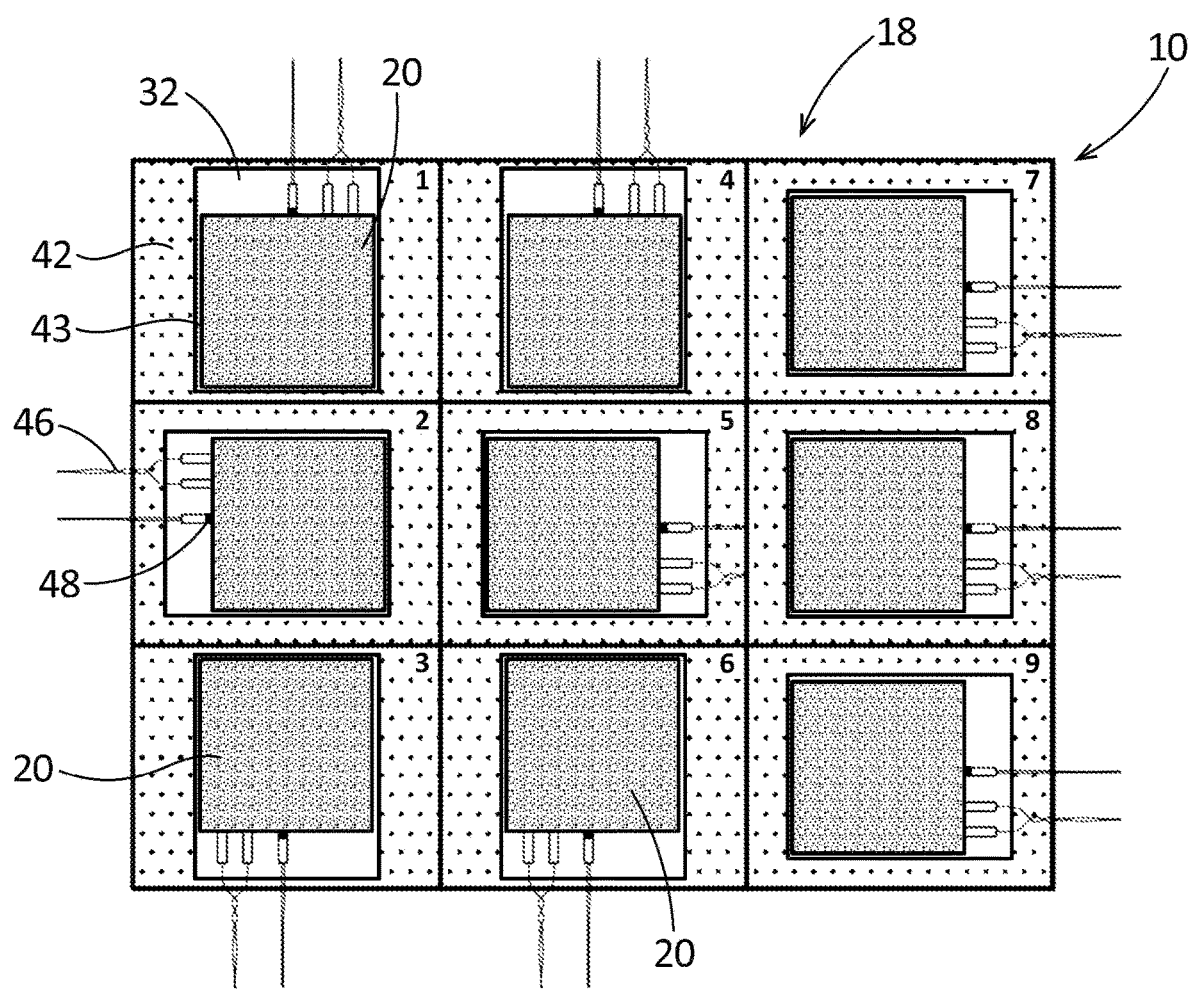
FIG. 7 is a schematic view of a plurality of heat flux sensors having both heat flux sensors and temperature sensors.

In some embodiments, the heat flux sensors 20 can have a generally square or rectangular shape, and the holes 43 in the insulating layer 42 can also be substantially rectangular shape of similar dimension to accommodate the heat flux sensors 20. In some embodiments, as shown in FIG. 7, the holes 43 in the insulating layer 42 can be slightly larger than the heat flux sensors 20 to accommodating the heat flux voltage leads 46 and the thermocouple voltage leads 48 connected to the heat flux sensors 20 and the thermocouples 22 respectively. In some embodiments, wires fed to the voltage leads In other embodiments, any suitable shape for the heat flux sensors 20 and the corresponding holes 43 in the insulating layer 42 can be utilized. When mounting the heat flux sensors 20 to the metal plate 32, a thermal paste can be applied between the sensor 20 and the metal plate 32 in order to enhance the thermal path between those two components. After the heat flux sensors 20 are mounted, the insulation layer 42 can be placed around the heat sensors 20 and a graphite thermal layer 44 can be placed on top to fix the sensors 20 in position and to help provide a smooth contact and heat transfer interface between the battery cell 12 and the lower thermoelectric assembly 18. It will be appreciated by one of skill in the art that the same configuration of the heat flux sensors 20 and thermal pad 30 can alternatively or additionally be applied to the upper thermoelectric assembly 16.

Figure 8:
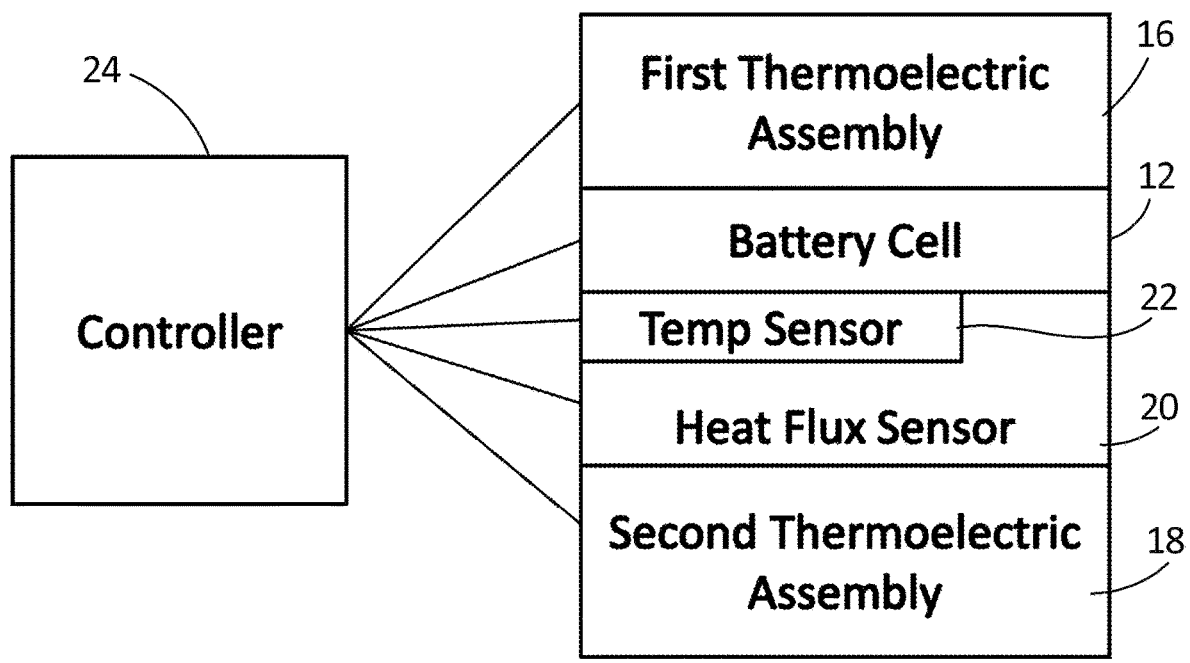
FIG. 8 is a schematic view of an embodiment of a controller for controlling operations of a calorimeter apparatus of the present disclosure.
Figure 9:
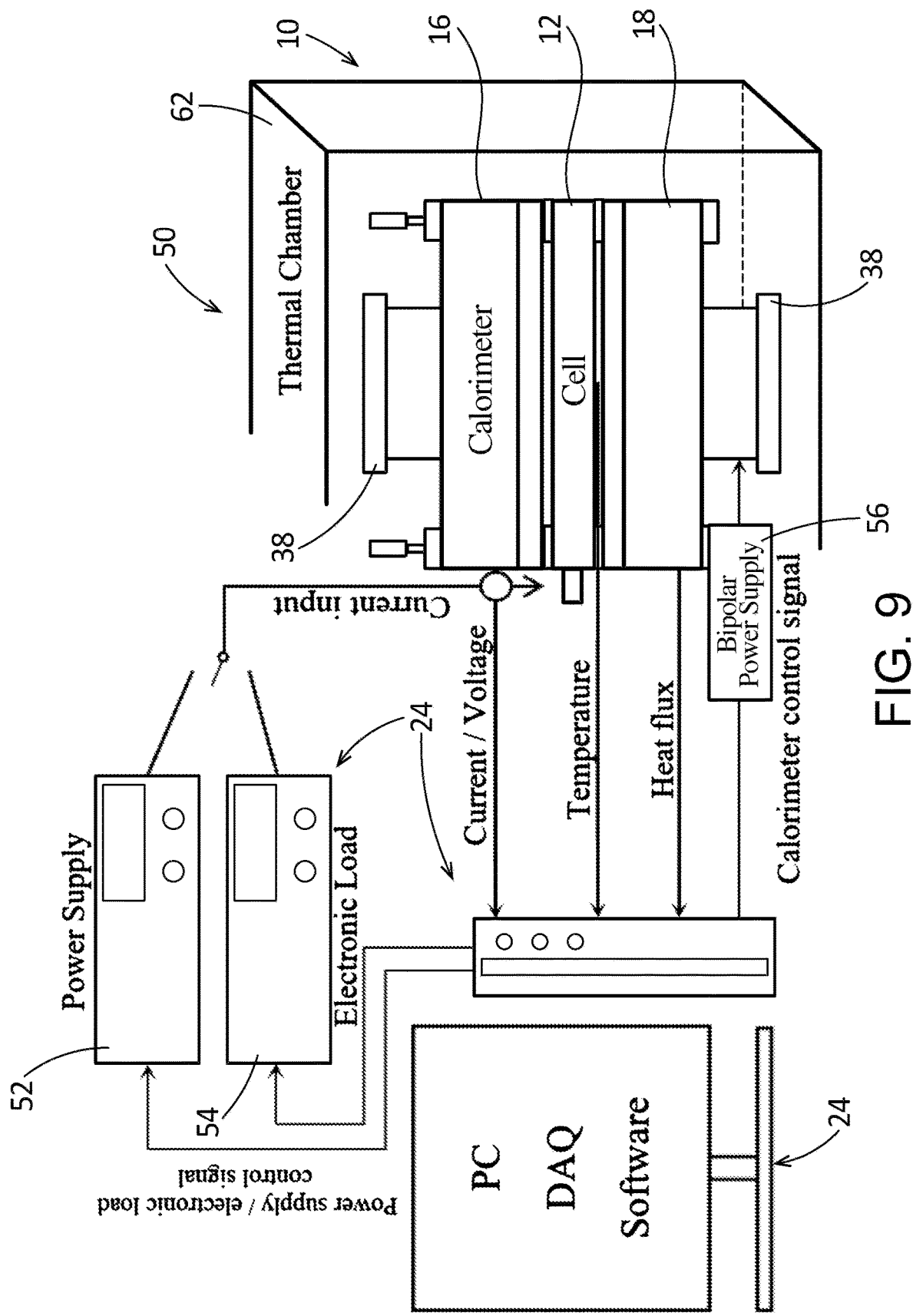
FIG. 9 is a detailed schematic view of another embodiment of a controller of a calorimeter apparatus of the present disclosure.

After the setup of the calorimeter apparatus 10 is completed, it can be placed in a battery test station 50, as shown in FIGS. 8-9. The test station 50 can constructed using a controller 24 including a programmable power supply 52 and an electronic load 54 to charge and discharge the battery cell 12, which are controlled by a data acquisition (DAQ) system along with programmed software that can actively provide different selectable profiles for charging and discharging current, as well as desired temperature profiles. The current, voltage, temperature, and heat flux data from the power supplies 52, electronic loads 54, heat flux sensors and temperature sensors are measured by data acquisition modules connected to the DAQ. As such, the controller 24 can be connectable to the battery cell 12 and selectively operable to provide power to and/or draw power from the battery cell 12 to cause the battery cell 12 to perform a charging and/or discharging operation, wherein heat generation rate measurements can be taken by the at least two heat flux sensors over time during the charging and/or discharging operation. The measurements and other calculations performed by the controller 24, including the DAQ, can be graphically displayed on the controller 24 itself or on a separate user interface. In some embodiments, the controller 24 can be operable to graphically display the heat generation rates measured at each heat flux sensor over time.

Figure 12:
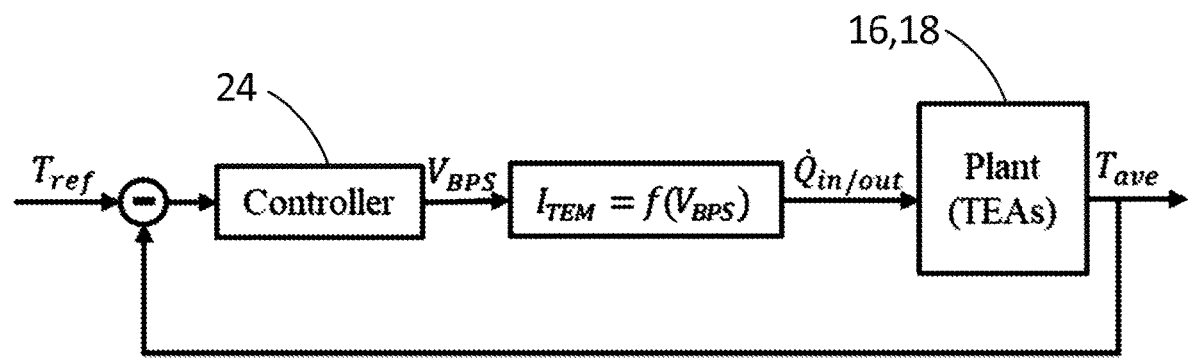
FIG. 12 is a flow diagram of an embodiment of a temperature control feedback loop utilized by a controller of a calorimeter apparatus of the present disclosure.

In some embodiments, the thermoelectric assemblies 16 and 18 can be powered by a bipolar power supply 56 which can reverse the flow of current and thus the heating and/or cooling operation of the thermoelectric assemblies 16 and 18. In order to accurately track a varying reference temperature (Tref), a feedback loop is designed as shown in FIG. 12. The average surface temperature of the cell (Tave) can be obtained by averaging the measured temperature data from the temperature sensors 22 of the calorimeter, and in some embodiments from the thermocouples on each of the heat flux sensors. In some embodiments, a desired temperature profile of the battery cell 12 may be to keep the average temperature of the battery cell 12 at a desired reference temperature (Tref). The observed difference between the measured Tave and Tref can be minimized by using the controller 24 to manipulate the input current of thermoelectric assemblies 16 and 18 to maintain the measured Tave as close to Tref as possible. The term ITEM-f(VBPS) in FIG. 12 describes the voltage controlled current source of the bipolar power supply, and Qin/out denotes the heating and cooling power of the thermoelectric assemblies 16 and 18 identified as the term "Plant (TEAs)" in FIG. 12. During the measurement, the calorimeter apparatus 10 is placed in a thermal chamber 62 so that the ambient temperature can be adjusted to meet the reference temperature Tref so that heat is not lost to the ambient.

In some embodiments, the controller 24 can be operable to add the sum of the heat generation rates measured by the at least two heat flux sensors 20 to determine a lumped heat generation rate for the entire battery cell 12. In some embodiments, as shown in FIG. 3, the at least two heat flux sensors 20 further comprise at least six heat flux sensors positioned between the first and second thermoelectric assemblies 16 and 18, and the controller 24 can be operable to add the sum of the heat generation rates measured by the at least six heat flux sensors 20 to determine a lumped heat generation rate for the battery cell 12. In some embodiments, as shown in FIG. 2, the at least two heat flux sensors 20 further comprise at least nine heat flux sensors 20 positioned between the first and second thermoelectric assemblies 16 and 18, and the controller 24 can be operable to add the sum of the heat generation rates measured by the at least nine heat flux sensors 20 to determine a lumped heat generation rate for the battery cell 12. Any suitable number of heat flux sensors 20 can be utilized in various embodiments, including but not limited to at least 2, 3, 4, 5, 6, 7, 8, 9, 10, 11, 12, 13, 14, 15, 16, 17, 18, 19, or 20 heat flux sensors, depending on the size and dimensions of the battery cell 12 to be measured.

In some embodiments, prior to actual measurements using the designed multifunctional calorimeter apparatus 10, the heat flux sensors 20 can be calibrated using a polyimide heater that has the same dimension as the sensing area and a known resistance. When the current flowing into the heater is properly controlled, the heater uniformly generates the heat, where the total heat is proportional to the amplitude of the current. Then, the amount of heat generation at each sensor is correspondingly calculated.

The calibration starts with adjusting the operating temperature to the required value and resting for 30 min to get a steady state. Then, a series of pulse currents is applied to the heater to generate the desired heat generation as an input to the calorimeter within the full range of the measurable heat flux. Each current pulse lasts for 10 min to allow for the calorimeter to reach an equilibrium state, and then followed by a 10 min rest period. The measured data at the output of the heat flux sensor within the last 1 min of each pulse tests are collected, averaged, and stored. The calibration conducted enables the maximum measurable L-HGR up to 120 W (13.3 W per segment), and the procedure may be repeated multiple times for increased accuracy. Then, the data of the output voltage vs. heat flux shows a linear relationship that can be approximated with a linear equation. The fitted equations are later used to determine the heat generation rate of the cell during the experiments.

Experimental Results

The cell used for experiments is large format pouch-type LMO-NMC/graphite cells. The specification of the cells include the following: (1) LMO (30%)-NMC (70%) for cathode, and graphite for anode; (2) Nominal capacity: 25.9 Ah; (3) End-of-charge voltage, current: 4.15V, 1.25 A; (4) End-of-discharge voltage: 2.5V; (5) Dimension: 203 mm (Length)×154 mm (Width)×7.2 mm (Height); (6) Current collector material: copper for cathode, and aluminum for anode.

Figure 11:
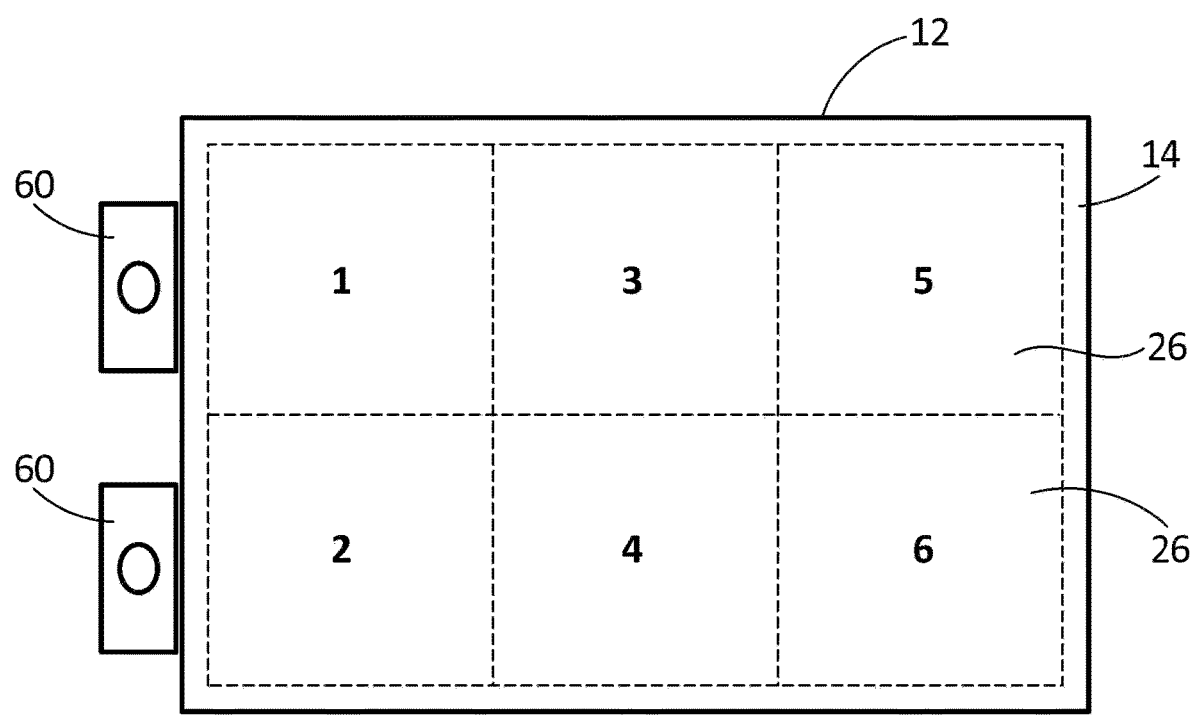
FIG. 11 is a top view of a battery cell having six identified portions of the surface of the battery cell where heat flux and temperature measurements can be taken.

Referring now to FIGS. 9-11, after the heat flux sensor calibration noted previously, the calorimeter above can be used to directly measure and analyze the 2D heat generation rate (2D-HGR) distribution at nine segmented locations on the surface of the cells. Each of segments of the battery cell is labeled from #1 to #9, as shown in FIG. 11. In one embodiment, the measurements have been carried out in following sequences:

a) Place the cell between the upper and lower thermoelectric assemblies of the calorimeter, and connect the tabs 60 to the power supply 52 of the test station 50 via clamps or any other suitable method.

b) Set the temperature inside the thermal chamber to 25° C. and rest for 30 min to stabilize the ambient temperature.

c) Turn on the calorimeter with a reference temperature set to 25° C., and rest for 1 hour to allow the system and the battery cell to reach a thermal equilibrium.

d) Apply the charging, discharging or driving cycle profiles to the battery cell from an initial state to the end state, and the test station records the data of the measured current, voltage, surface temperatures, and the voltage outputs of heat flux and temperature sensors.

e) Upon completion of the tests, the data is processed by means of de-noise, calculation, analysis and visualization.

During testing, the surface temperature of the cell is actively controlled at a set reference temperature in the calorimeter under assumed isotherm condition through the plane direction because of the relatively thin thickness of the tested cell. The regulating performance of the temperature control of the calorimeter is assessed by a reference temperature of the calorimeter set at 25° C., where the disturbances are produced by applying 1 C and/or 2 C charging and discharging current rates. The tracking behavior is tested with the input temperature reference that has a sinusoidal profile of T(t)=25+10 sin(ϕt/600) C.

In addition, L-HGR and 2D-HGR of a cell are measured at 25° C. of the surface temperature, where the cell is charged and discharged at 1 C and 2 C between 0% and 100% SOC or until the terminal cutoff voltage of 4.15V and 2.5V, respectively.

In some embodiments, the controller can be operable to produce a sinusoidal temperature excitation to the battery cell and calculate an entropy coefficient of the battery cell utilizing the measured change of a terminal voltage of the battery cell during the sinusoidal temperature excitation. The outstanding tracking performance of the calorimeter is further used to measure the entropy coefficient, and its measurement time is significantly reduced using the hybridized time-frequency domain analysis (HTFDA) method, discussed in the publication titled "Hybridized time-frequency method for the measurement of entropy coefficient of lithium-ion battery," *Electrochim. Acta*, p. 137124, September 2020, doi: 10.1016/j.electacta.2020.137124, which is incorporated herein in its entirety.

In one embodiment, the entropy measurements procedure is as follows;

a) Place the cell between the upper and lower part of the calorimeter, and connect the tabs to the charge/discharge cables of the power supply of the test station.

b) Fully charge the cell at 25° C., and then stepwise discharge the cell at 0.1 C for 30 minutes, which corresponds to a 5% SOC decrease.

c) After each discharge step, rest the cell for 30 min, and then apply a sinusoidal temperature profile, T(t)=25+10 sin(ϕt/600° C.), to the cell for two periods.

d) Rest the cell at 25° C. for 10 minutes and then repeated for the next discharge step.

e) Upon completion of the tests, the data is processed by the HTFDA technique for the determination of the entropy coefficient.

Firstly, the L-HGR and 2D-HGR of the fresh cell were measured under 1 C and 2 C, charge and discharge C-rates at 25° C. For all tests, the maximum surface temperature was regulated with less than 0.6° C. variance as measured at nine segments of the cell. The 2D-HGR measurement results are plotted in FIG. 13(*a*)-(*d*) as the stacked areas, which represents the values of the local HGR at each segments over time. The corresponding L-HGR is then calculated by combining the nine individual local HGRs, which is plotted as the thick black border lines in the figures.

Measurement results have shown that the L-HGR tends to increase as the current increases. In addition, the L-HGR during charging is generally larger than that during the discharging at 1 C operation, while the tendency becomes opposite when the applied C-rate increases to 2 C. Moreover, the shape of the L-HGR curves is strongly dependent upon the charging and discharging process and the C-rates. These responses can be better analyzed using two heat source terms, irreversible and the reversible heat. The expression of the total heat generated is given in Eq. (1) below;

$$\dot{Q}_{total} = \dot{Q}_{irr} + \dot{Q}_{rev} = I^2 \cdot R - I \cdot T \cdot \frac{dU_{OC}}{dT}, \quad (1)$$

where I, T, $$\left(\frac{dU_{OC}}{dT}\right)_{\frac{dU_{OC}}{dT}}$$

and R denote the current, temperature, entropy coefficient and internal resistance of the cell.

The irreversible heat source term in Eq. (1), is a function of $I^2$, which represents an exothermic process regardless of charging or discharging. The reversible heat source term, however, is a function of both I and $$\left(\frac{dU_{OC}}{dT}\right)_{\frac{dU_{OC}}{dT}},$$

which becomes endothermal or exothermal depends upon the direction of the applied current, and the sign of $$\left(\frac{dU_{OC}}{dT}\right)_{\frac{dU_{OC}}{dT}}.$$

The $$\left(\frac{dU_{OC}}{dT}\right)_{\frac{dU_{OC}}{dT}}$$

of tested cells has been investigated in previous works. Results show that the coefficient becomes negative within the SOC range of 0%~37.8%, 65.5%~88.5%, and is positive in the 37.8%~65.5% and 88.5%~100% SOC range. In addition, the minimum and maximum point of the $$\left(\frac{dU_{OC}}{dT}\right)_{\frac{dU_{OC}}{dT}}$$

is at 5% SOC and 45% SOC, with values of $-3.7\times10^{-4}$ V/K and $1.0\times10^{-4}$ V/K, respectively. When the cell is being charged at the negative-entropy-coefficient SOC ranges, or discharged at the positive-entropy-coefficient SOC ranges, the reversible heat is endothermic. Conversely, it becomes exothermic if the polarization of the current is reversed in the same SOC ranges.

Figure 13A:
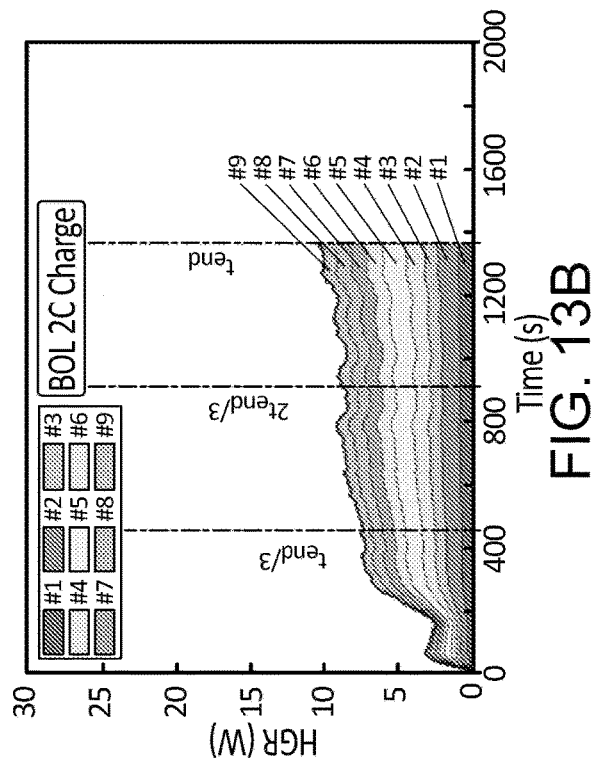
FIGS. 13a-13f are graphs showing experimental calorimeter results of performance parameters of a battery cell utilizing a calorimeter apparatus and measurement methods of the present disclosure.

The effects of the reversible heat source to the L-HGR can be clearly observed when the cell is operated at lower C-rates (for example, 1 C charge or discharge in this study). As shown in FIG. 13(a), initially at the beginning of 1 C charge, the heat is generated by the increased irreversible heat due to the high Ohmic resistance of the cell at low SOC. Then, heat absorption takes place during a period, which is attributed to an increasing endothermic reversible heat. In addition, the increase of L-HGR from 1200 s to 1900s and the following decreasing tendency from 1900s to 2800 s basically match the transition of the reversible heat source from exothermic to endothermic in the 37.8° 4-65.5% and 65.5° 4-88.5% SOC ranges, respectively. Similar result can be found in FIG. 13(c) when the cell operates at 1 C discharge condition. An apparent V-shape tendency of the L-HGR curve from 1250 s to 2350 s is also observed with the valley point at near 1980s, which corresponds to the endothermic reversible heat source from 65.5% to 37.8% SOC with the maximum value of heat absorption near 45% SOC.

Figure 13B:
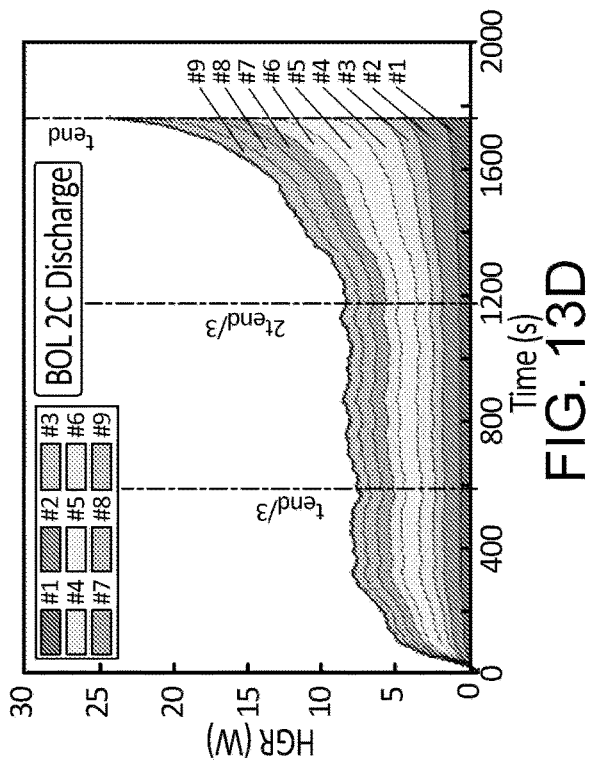
Figure 13C:
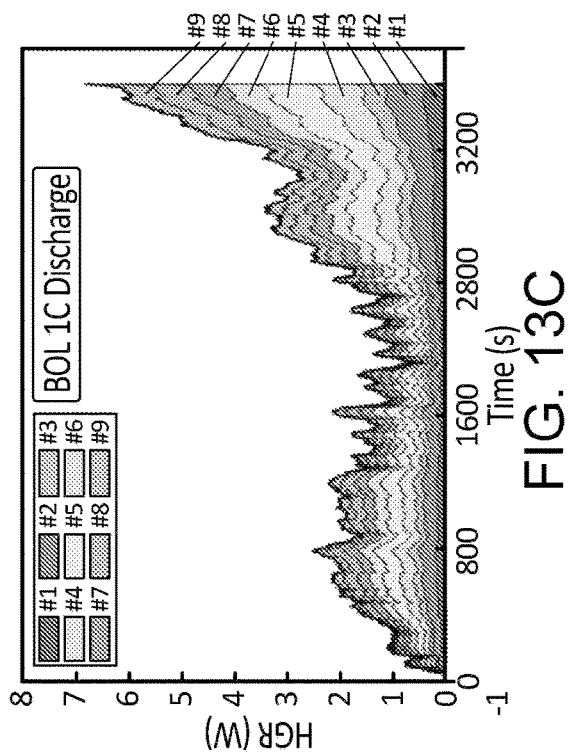
Figure 13D:
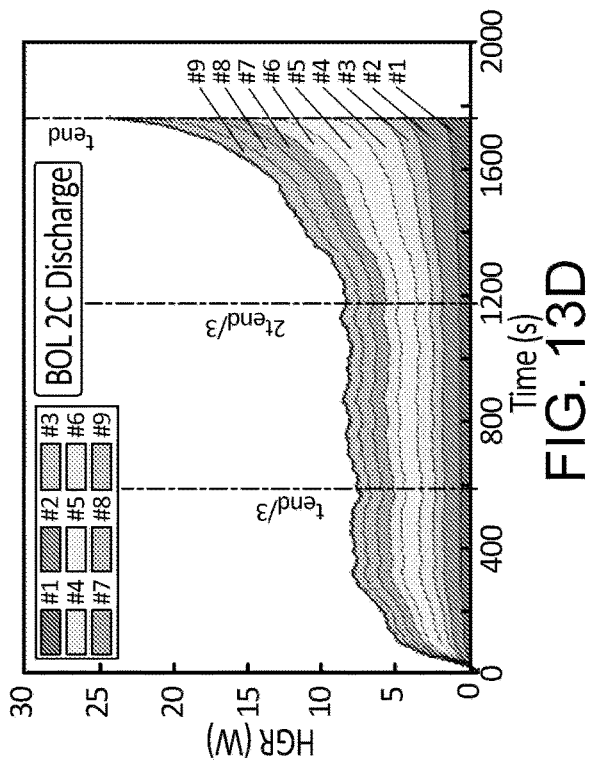

When the cell is operated with a high C-rate (2C), as plotted in FIGS. 13(b) and (d), the L-HGR clearly increase compared with that with IC because of the increased reversible and irreversible heat generation. In addition, the shape of the L-HGR curves has changed as the applied current increases. For example, at 1 C charge, there is a period of endothermic behavior at the beginning of the operation, while at 2 C charge, the overall thermal behavior of the cell becomes an exothermic process. At discharging at 1 C, L-HGR curve shows multiple inflection points, while the L-HGR at 2 C shows a monotonically increasing behavior. In addition, the L-HGR during 1 C charging is generally larger than that during the 1 C discharging, while the tendency becomes opposite when the applied C-rate increases to 2 C. In fact, as shown in Eq. (1), the reversible heat generation is a linear function of the current whereas the irreversible heat generation is a function of squared current. When the applied current increases, the increased amount of the irreversible heat generation is higher than that of the reversible one, and thus the irreversible heat generation becomes dominant in the L-HGR. In other words, the characteristics of the reversible heat (especially for endothermal reversible heat) becomes less obvious on the L-HGR curve at 2 C operations, resulting in a rather smooth L-HGR curve across most SOCs. Nonetheless, due to the large peak value of the negative entropy coefficient at 5% SOC, the impact of the endothermal reversible heat during 2 C charging is still high from the L-HGR curve, which indicates a local minimum value round 155 s in FIG. 13(b).

The results measured at nine different locations on the surface of the cell, as plotted in FIG. 13(a)-(d), have shown variation of the local HGR during the operation of the cell. The magnitude of the measured local HGR has different values dependent upon each locations of the cell during both charging and discharging process. In order to clarify the contribution of the local HGR to the total L-HGR, the percentage of HGR at location #i and at a given time t, $p_{HGR,i}(t)$, is calculated according to the equation below;

$$p_{HGR,i}(t) = HGR_i(t)/\sum_{i=1}^{n} HGR_i(t) \times 100\%, \quad (2)$$

where the term $HGR_i$ denotes the local HGR at location #i.

Figure 13E:
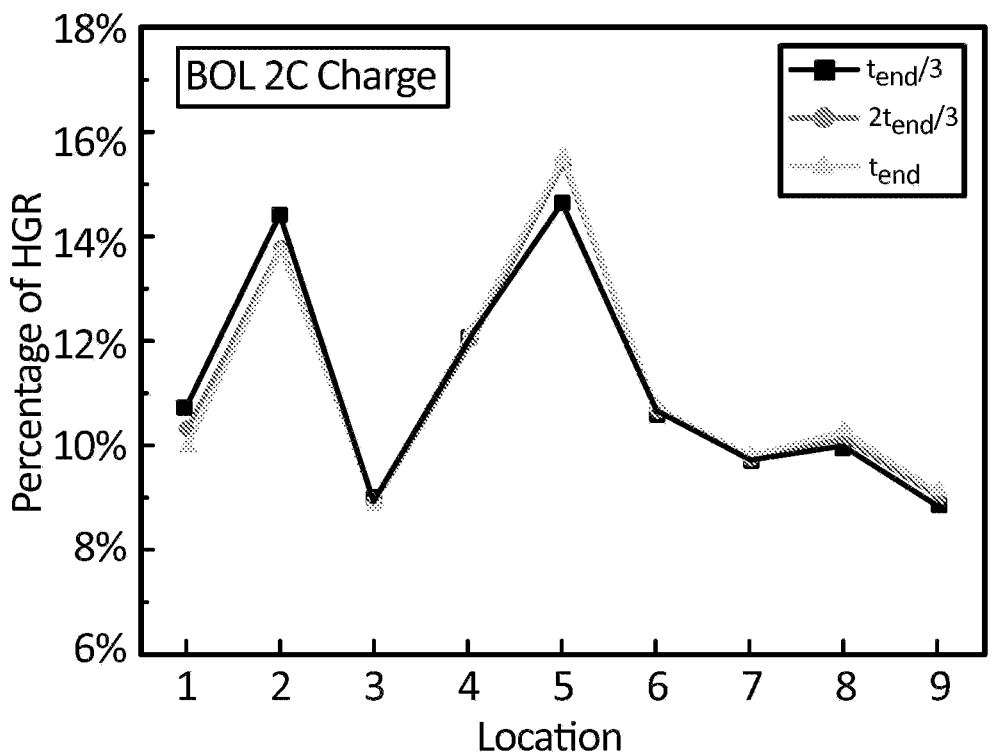
Figure 13F:
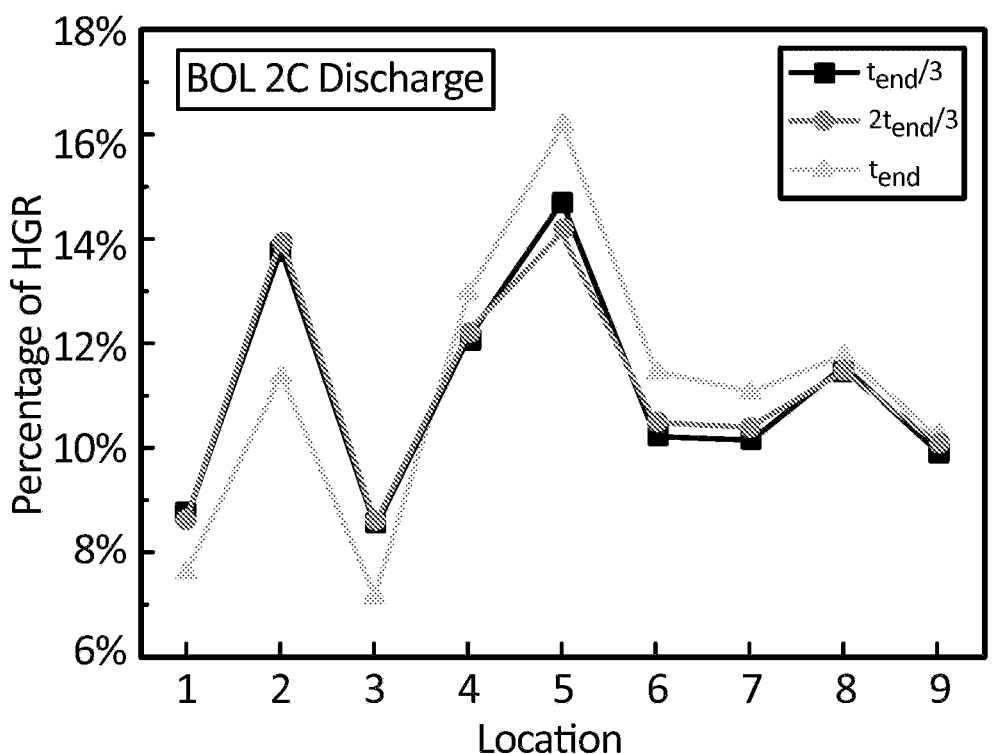

Here, the $p_{HGR,i}$ is analyzed at three evenly-selected time steps, $t=t_{end}/3$, $2t_{end}/3$, $t_{end}$, where $t_{end}$ denotes the total time of the operation at both 2 C charging and discharging process, and is plotted in FIGS. 13(e) and (f), respectively. The results have shown that the distribution of the measured local HGR for both charging and discharging have similar tendency, where the highest heat is generated at the center of the cell (#5). When comparing the HGR difference along the width direction (#1-3, #4-6, and #7-9), there is a HGR gradient, where the HGR near the edge of the cell is generally lower than that close to the center line. In addition, the HGR gradient along the width direction near the tab side is more predominant while the one located far away from the tab (end side) is insignificant. FIGS. 13(e) and (f) also show a comparison of the $p_{HGR}$ distribution at different operation times. When the cell is charged with 2 C, the $p_{HGR}$ at nine segments basically remain constant at three time steps, which indicates that the contribution of the local HGR at different locations of the cell does not change over time. As for 2 C discharging, the $p_{HGR}$ distribution remains unchanged at $t=t_{end}/3$ and $2t_{end}/3$. At the end of the discharging process, the change of the $p_{HGR}$ at the end side is still negligible. However, the $p_{HGR}$ at the middle part in length of the cell (#3-5) are drastically increasing with the highest $p_{HGR}$ value of 16.2% at the center of the cell (#5), while the $p_{HGR}$ near the tab (#1-3) are accordingly decreasing. In addition, at the end of the 2 C discharge operation, the contribution of the L-HGR at the middle part becomes even higher, which increases the non-uniformity of the 2D-HGR distribution.

The change of the 2D-HGR non-uniformity can be quantified by calculating the HGR variance, Var(HGR), of the battery cell, which is expresses as:

$$\text{Var}(HGR) = \frac{1}{n}\sum_{n=1}^{n}(HGR_i - \overline{HGR}), \quad (3)$$

where $\overline{HGR}$ denotes the average of local HGR, and is calculated by:

$$\overline{HGR} = \frac{1}{n}\sum_{n=1}^{n} HGR_i \quad (4)$$

The larger Var(HGR) value indicates a greater 2D-HGR fluctuations and non-uniformity of the battery cell.

Figure 14:
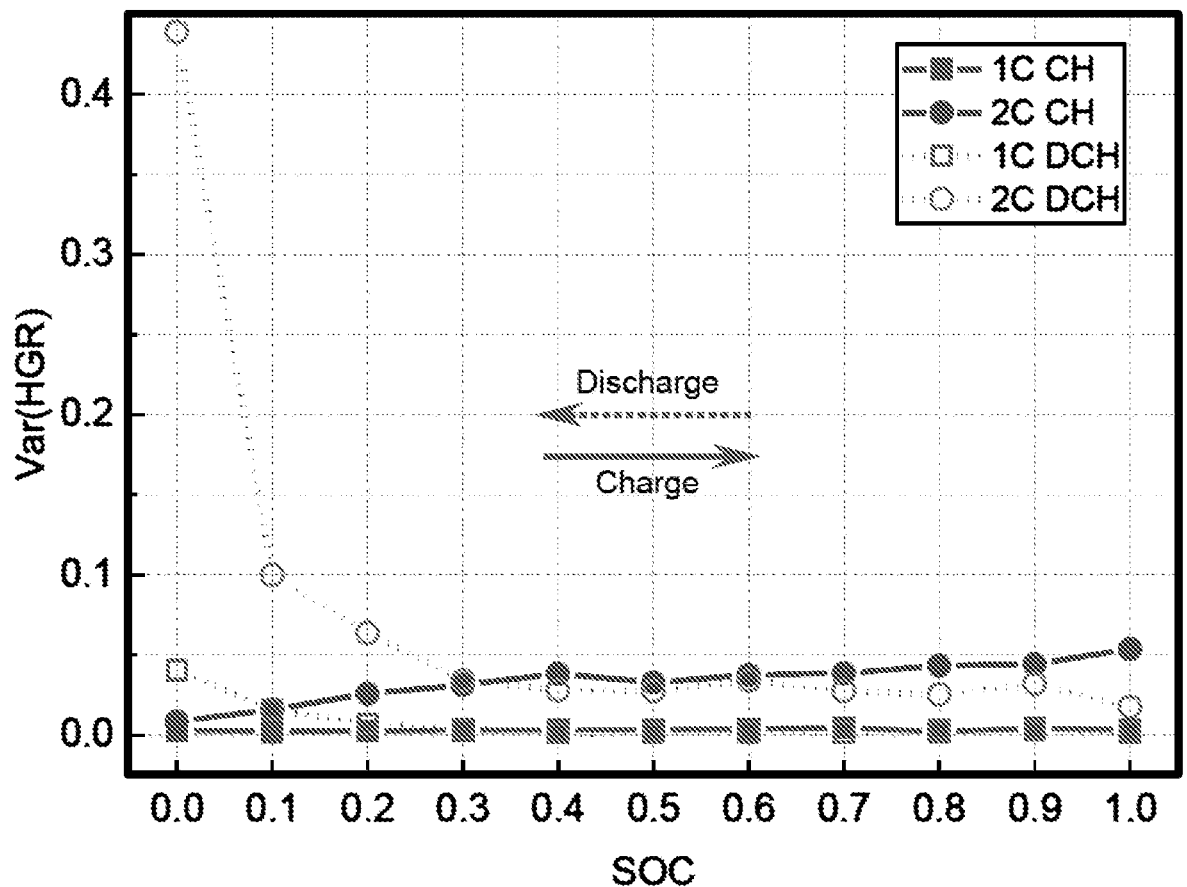
FIG. 14 shows a graph of experimental results of the heat flux variance of a battery cell at different operating conditions and charge states.

FIG. 14 shows the Var(HGR) at different SOCs, which is calculated from the measured 2D-HGR results above. When the cell is charged at 1 C, the Var(HGR) is negligible from 0% to 100% SOC, which indicates a good uniformity of the 2D-HGR during the whole operation period. Similar trend has shown when the cell is discharged at 1 C from 100% SOC to 20% SOC. However, when the cell is discharged below 20% SOC, the Var(HGR) starts to increase, which indicates that the 2D-HGR non-uniformity begins to appear. The non-uniformity is mainly caused by the sharply increased HGR at the end of 1 C discharge. As the applied current increases to 2 C, the irreversible heat becomes dominant and then the HGR increases significantly. Therefore, the HGR becomes higher. Meanwhile, increased C-rate leads to a shortened charge/discharge time, such that the concentrated heat cannot be transferred inside the cell in a short time. Consequently, a larger 2D-HGR non-uniformity is generated, which is reflected as an increased Var(HGR) shown in FIG. 14.

Figure 15A:
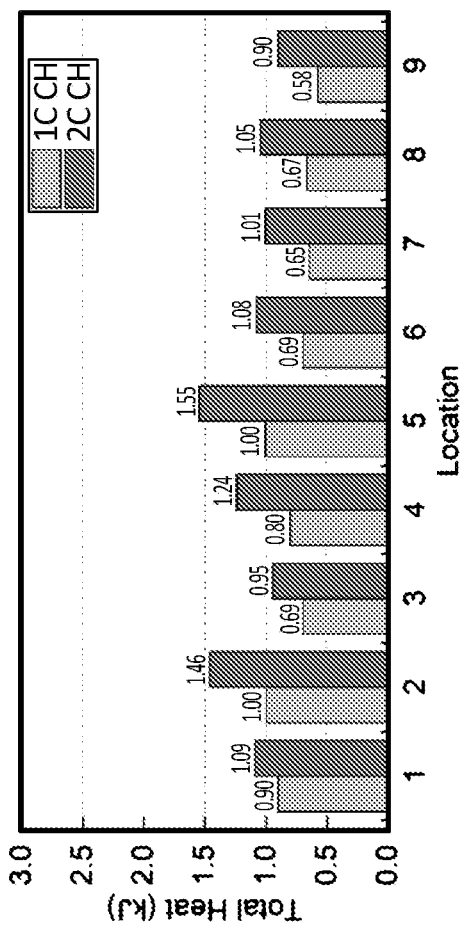
FIGS. 15a-15c show experimental heat generation measurements at nine segmented locations at 1 C and 2 C capacities for (a) charging and (b) discharging at 25° C. and (c) percentage of total heat generation.
Figure 15C:
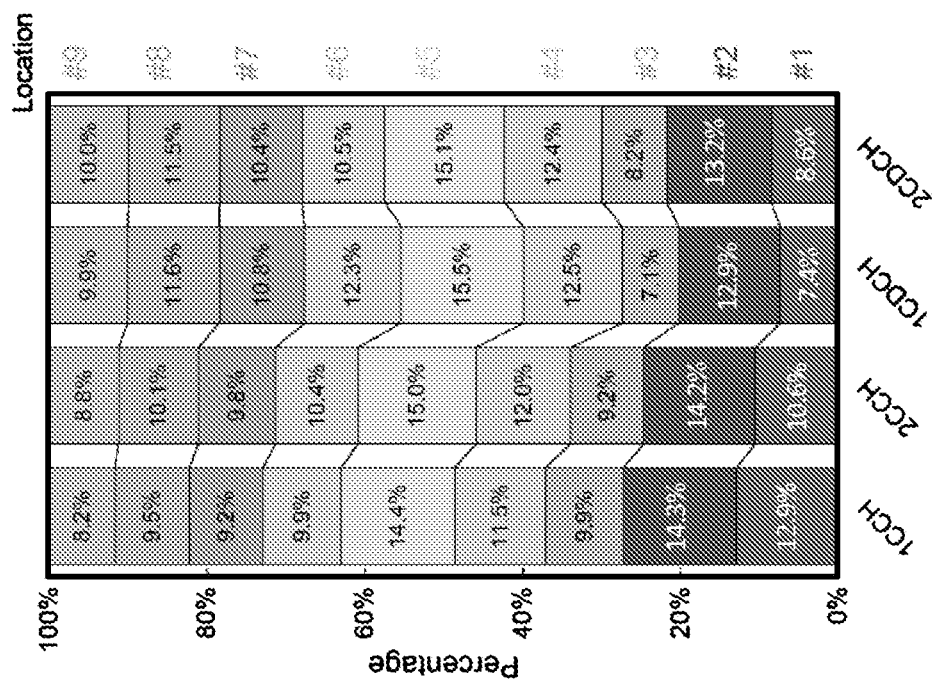
Figure 15B:
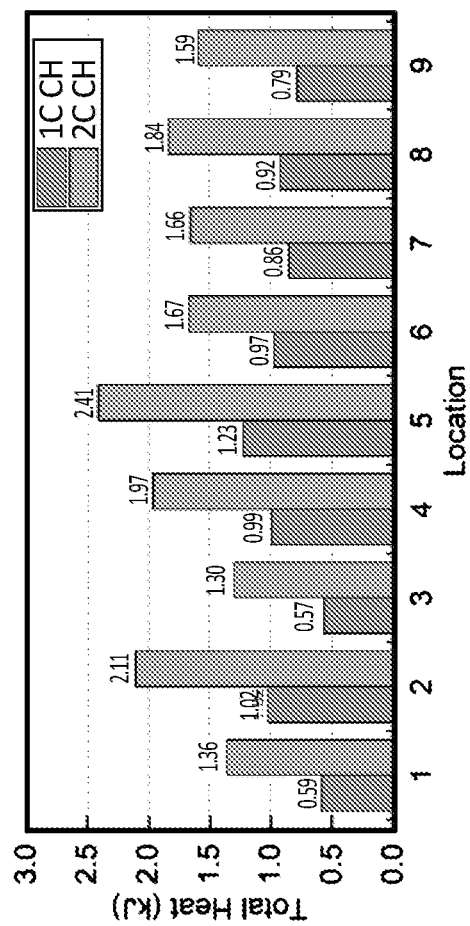

The total generated heat at nine segmented locations is calculated based on the data in FIGS. 13(a)-(f). The results are shown in FIG. 15 (a) and (b). It is obvious that the heat generation increases at all the locations when the operating current increases because of the increased irreversible heat. In addition, measured local total heat in the middle parts of the cell is higher than those near the edge, where the highest heat is generated at the center of the cell (#5) during both charging and discharging conditions. FIG. 15 (c) shows the percentage of the total heat at each segmented locations, which represents their contributions to the overall heat generation. During both 1 C and 2 C charge and discharge, the contributions of the total heat at the location #4-#9 basically have shown similar tendency. However, at the near-tab locations (#1-3), the percentage of the local total heat has shown different trend for charge and discharge operations. Possibly, such differences might be related to the heat transfer behavior via the metal tabs.

Figure 16A:
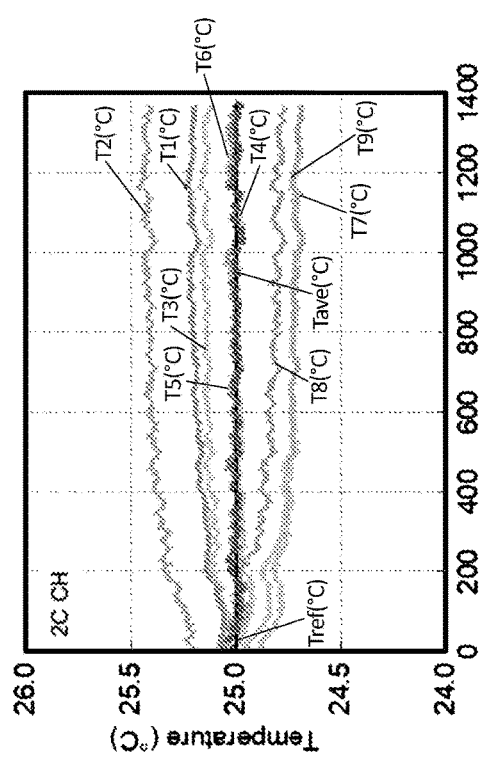
FIGS. 16a-16c show experimental temperature responses for a temperature feedback loop at 25° C. constant temperature under 2 C operations conditions for (a) charging and (b) discharging, and (c) at a sinusoidal temperature input.
Figure 16B:
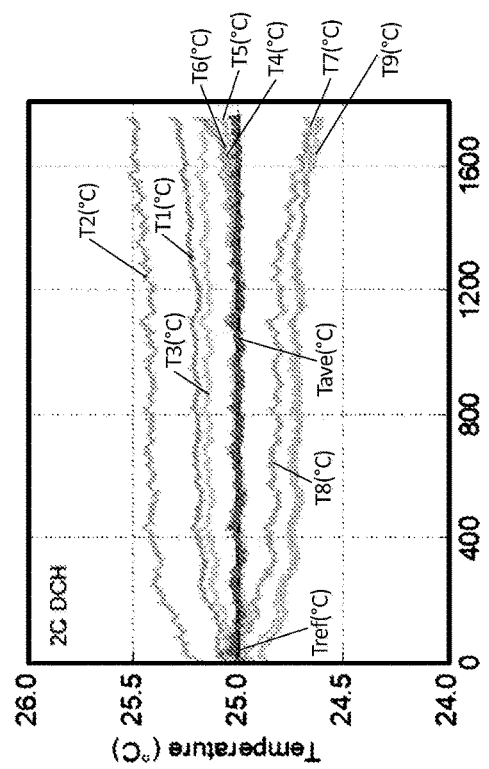
Figure 16C:
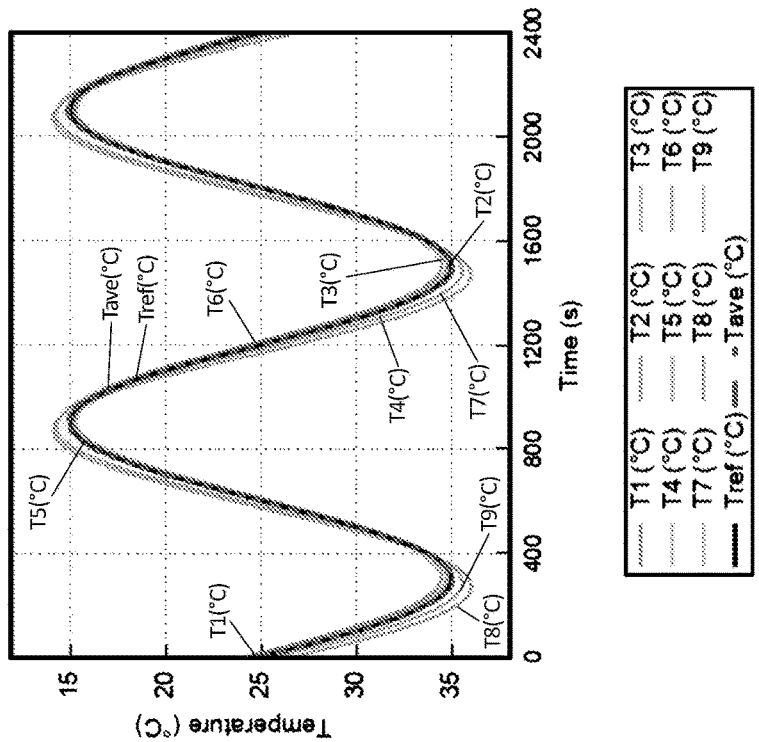

FIGS. 16 (a) and (b) show a reference temperature of 25° C. (black solid lines) and temperature responses of each segment or portion of the battery cell surface and the average temperature (dashed lines) during charging and discharging. Results show that the calorimeter is able to well regulate the set temperature even at the continuous heat generation during 2 C charging or discharging, with the maximum absolute error observed being 0.045 and 0.051° C., respectively. Considering the non-uniform heat generation behavior of the cell, the local temperature at nine segments have shown a discrepancy from the reference value, with the maximum deviations observed being 0.474° C. and 0.537° C., respectively.

In addition, the temperature response at a sinusoidal input is plotted in FIG. 16 (c). The results have shown that the average temperature is able to track the reference temperature with relatively good accuracy. The maximum absolute error between the average surface temperature and the reference one is 0.182° C. and the maximum deviation of the temperatures at nine locations was observed to be 1.85° C.

Figure 17:
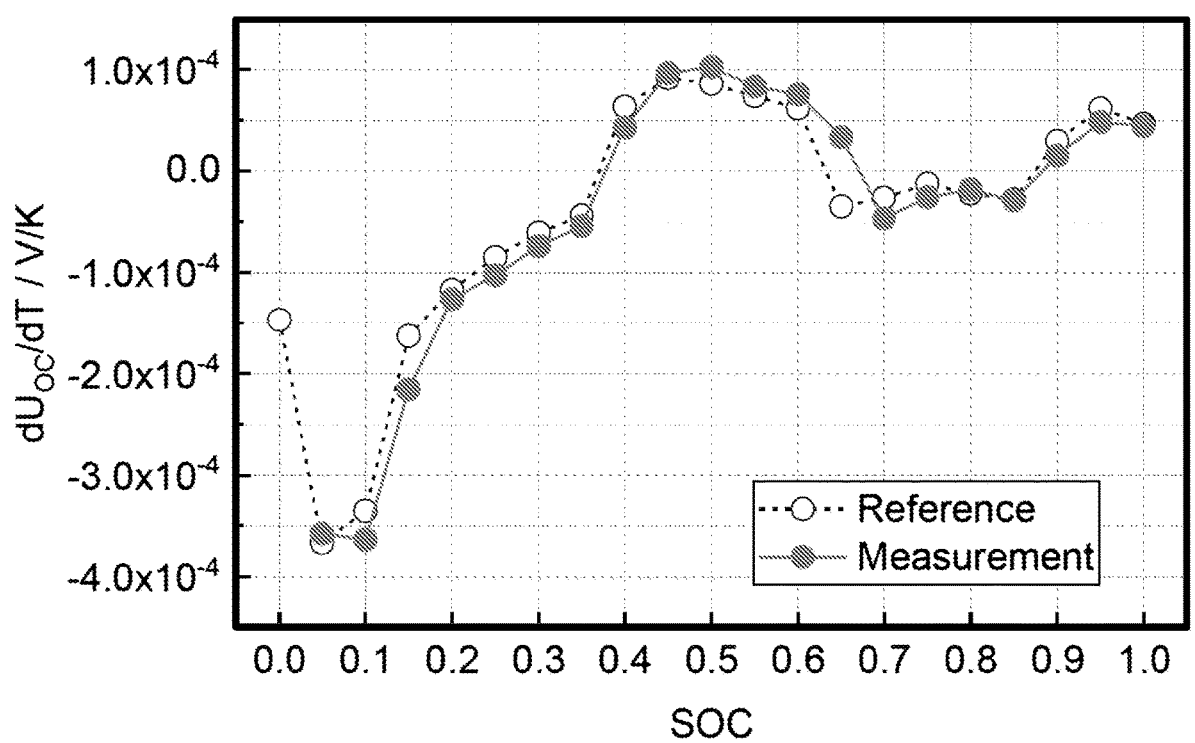
FIG. 17 shows experimentally derived entropy values for a battery cell placed in a calorimeter apparatus of the present disclosure compared to reference entropy values using prior art verified measurement methods.

The measured entropy coefficient using the developed multifunctional calorimeter is plotted as the solid line in FIG. 17 as a function of SOC. For comparison, the measured entropy coefficient by the prior art potentiometric method is also plotted in FIG. 16 as a reference, which is shown as the dashed line. The resulting curve shows that the observed entropy coefficient for the cell ranges from $-3.64 \times 10^{-4}$ V/K to $1.02 \times 10^{-4}$ V/K, which is quantitatively consistent with the reference that in the range of $-3.67 \times 10^{-4}$ V/K to $9.14 \times 10^{-5}$ V/K. In addition, the shape of both curves is similar to each other, where the sign of the entropy coefficient becomes negative around 38%, 67% and 89% SOC, which indicates a transition between endothermic and exothermic process of the reversible heat generation. The result above verifies the effectiveness of the developed multifunctional calorimeter as a dedicated system for a fast and accurate determination of the entropy coefficient.

As such, a new multifunctional calorimeter using thermoelectric assemblies and at least two heat flux sensors along with a temperature controller has been disclosed, which includes following three major functionalities: measurement of the L-HGR and 2D-HGR of a lithium-ion battery; active control of a wide range of the surface temperature of a battery cell 12, so that the distributed heat generation in each portion of the battery cell surface 14 can be independently analyzed by creating different surface temperatures; and fast and accurate measurement of the entropy coefficient of a battery cell 12.

Thus, although there have been described particular embodiments of the present invention of a new and useful Multifunctional calorimeter For Measurements of Lumped and Two Dimensional Heat Generation Rates and entropy Coefficients of Pouch Type Lithium-Ion Battery, it is not intended that such references be construed as limitations upon the scope of this invention.

What is claimed is:

1. A calorimeter apparatus for measuring lumped and two dimensional heat generation of a battery cell having a battery cell surface, the apparatus comprising:
   a first thermoelectric assembly;
   a second thermoelectric assembly; and
   at least two heat flux sensors positioned between the first and second thermoelectric assemblies;
   wherein the first and second thermoelectric assemblies are operable to selectively receive the battery cell between the first and second thermoelectric assemblies and substantially maintain a temperature of the battery cell surface in conformity with a predetermined temperature profile; and
   wherein when the battery cell is positioned between the first and second thermoelectric assemblies, the at least two heat flux sensors are operable to measure heat generation rates of the battery cell at corresponding portions of the battery cell surface.

2. The calorimeter apparatus of claim 1, further comprising an insulating layer positioned between the first and second thermoelectric assemblies and around lateral sides of each of the at least two heat flux sensors.

3. The calorimeter apparatus of claim 2, wherein the insulating layer includes an insulating foam layer with a plurality of holes cut through the insulating foam layer, each of the plurality of holes being shaped to conform to and receive a corresponding heat flux sensor therein.

4. The calorimeter apparatus of claim 3, wherein the insulating foam layer and the at least two heat flux sensors have substantially similar thicknesses such that each of the heat flux sensors is in a substantially flush orientation with the insulating foam layer.

5. The calorimeter apparatus of claim 4, further comprising a graphite thermal layer positioned against the insulating foam layer and the at least two heat flux sensors, the graphite thermal layer being positioned between the heat flux sensors and the battery cell when the battery cell is received between the first and second thermoelectric assemblies.

6. The calorimeter apparatus of claim 1, further comprising:

at least one temperature sensor operable to measure the temperature of the battery cell surface; and a controller communicated with the first and second thermoelectric assemblies and the at least one temperature sensor, the controller operable to control the first and second thermal assemblies in response to temperature measurements received from the at least one temperature sensor to substantially maintain the temperature of the battery cell surface in conformity with the predetermined temperature profile.

7. The calorimeter apparatus of claim 6, wherein:

each of the at least two heat flux sensors comprises a temperature sensor operable to measure a temperature of the corresponding portion of the battery cell surface; and the controller is operable to calculate an average temperature of the battery cell surface from the temperature measurements received from all of the temperature sensors and substantially maintain the average temperature of the battery cell surface in conformity with the predetermined temperature profile.

8. The calorimeter apparatus of claim 6, wherein the controller is operable to graphically display the heat generation rates measured by each heat flux sensor over time.

9. The calorimeter apparatus of claim 6, wherein the controller is connectable to the battery cell and selectively operable to provide power to and/or draw power from the battery cell to cause the battery cell to perform a charging and/or discharging operation, wherein the heat generation rate measurements are taken by the at least two heat flux sensors over time during the charging and/or discharging operation.

10. The calorimeter apparatus of claim 9, wherein the thermoelectric assemblies are supplied power via the controller from one or more bipolar power supplies.

11. The calorimeter apparatus of claim 6, wherein the controller is operable to add the heat generation rates measured by the at least two heat flux sensors to determine a lumped heat generation rate for the battery cell.

12. The calorimeter apparatus of claim 11, wherein:

the at least two heat flux sensors comprise at least six heat flux sensors positioned between the first and second thermoelectric assemblies; and the controller is operable to add the heat generation rates measured by the at least six heat flux sensors to determine the lumped heat generation rate for the battery cell.

13. The calorimeter apparatus of claim 11, wherein:

the at least two heat flux sensors comprise at least nine heat flux sensors positioned between the first and second thermoelectric assemblies; and the controller is operable to add the heat generation rates measured by the at least nine heat flux sensors to determine the lumped heat generation rate for the battery cell.

14. The calorimeter apparatus of claim 11, wherein the controller is operable to produce a sinusoidal temperature excitation to the battery cell and calculate an entropy coefficient of the battery cell utilizing a measured change of a terminal voltage of the battery cell during the sinusoidal temperature excitation.

15. A calorimeter apparatus for measuring lumped and two dimensional heat generation of a battery cell having a battery cell surface, the apparatus comprising:

a first thermoelectric assembly;
a second thermoelectric assembly;

at least two heat flux sensors positioned between the first and second thermoelectric assemblies, each of the heat flux sensors including a temperature sensor; and a controller communicated with the at least two heat flux sensors and the first and second thermoelectric assemblies;

wherein the first and second thermoelectric assemblies are operable to selectively receive the battery cell between the first and second thermoelectric assemblies and substantially maintain a temperature of the battery cell surface in conformity with a predetermined temperature profile;

wherein when the battery cell is positioned between the first and second thermoelectric assemblies, the at least two heat flux sensors are operable to measure heat generation rates of the battery cell at corresponding portions of the battery cell surface, and the temperature sensor on each heat flux sensor is operable to measure a temperature of the corresponding portion of the battery cell surface;

wherein the controller is operable to:

receive the temperature measurements from the temperature sensors and control the first and second thermoelectric assemblies based on the temperature measurements to maintain the temperature of the battery cell surface in conformity with the predetermined temperature profile; and receive heat generation rate measurements from each of the heat flux sensors to determine a lumped heat generation rate for the battery cell and also a two dimensional heat generation rate for the battery cell surface.

16. A method for measuring two dimensional heat generation rates of a battery cell having a battery cell surface, the method comprising the steps of:

providing a calorimeter apparatus including:
a first thermoelectric assembly;
a second thermoelectric assembly; and
at least two heat flux sensors positioned between the first and second thermoelectric assemblies;

placing the battery cell between the first and second thermoelectric assemblies with the heat flux sensors in a position to measure the two dimensional heat generation rates of corresponding portions of the battery cell surface;

maintaining a temperature of the battery cell surface in conformity with a predetermined temperature profile utilizing the first and second thermoelectric assemblies;

performing a charging cycle and/or a discharging cycle in the battery cell; and measuring the two dimensional heat generation rates of corresponding portions of the battery cell surface during the charging cycle and/or discharging cycle.

17. The method of claim 16, wherein:

the calorimeter apparatus further comprises a temperature sensor on each heat flux sensor, each temperature sensor operable to measure the temperature of the corresponding portion of the battery cell surface; and the calorimeter apparatus further comprises a controller operable to control the thermoelectric assemblies to maintain the temperature of the battery cell surface in conformity with the predetermined temperature profile based on temperature measurements received by the controller from the temperature sensors.

18. The method of claim 16, further comprising for a given time reference, combining the measured two dimensional heat generation rates from each of the heat flux sensors to calculate a lumped two dimensional heat generation rate for the battery cell for the given time reference.

19. The method of claim 18, further comprising the steps of:
- producing a sinusoidal temperature excitation in the battery cell during the charging cycle and/or discharging cycle;
- measuring a terminal voltage of the battery cell during the sinusoidal temperature excitation of the battery cell; and
- determining an entropy coefficient of the battery cell utilizing the measured terminal voltage of the battery cell during the sinusoidal temperature excitation.

20. The method of claim 19, wherein:
- the calorimeter apparatus further comprises a controller operable to control the thermoelectric assemblies to maintain the temperature of the battery cell surface in conformity with the predetermined temperature profile;
- wherein the controller is operable to receive the measured two dimensional heat generation rates from the heat flux sensors to determine the lumped two dimensional heat generation rate and two dimensional heat generation rate profiles for the battery cell, and determine the entropy coefficient of the battery cell.

* * * * *